US010436373B2

(12) United States Patent
Gaunce

(10) Patent No.: US 10,436,373 B2
(45) Date of Patent: Oct. 8, 2019

(54) COPPER PLUMBING PINHOLE PREVENTION; PINHOLE REPAIR AND PROTECTION FOR LONG LIFE OF COPPER PLUMBING

(71) Applicant: Frank Seth Gaunce, Port St. Lucie, FL (US)

(72) Inventor: Frank Seth Gaunce, Port St. Lucie, FL (US)

( * ) Notice: Subject to any disclaimer, the term of this patent is extended or adjusted under 35 U.S.C. 154(b) by 0 days.

(21) Appl. No.: 16/295,222

(22) Filed: Mar. 7, 2019

(65) Prior Publication Data

US 2019/0277436 A1    Sep. 12, 2019

Related U.S. Application Data

(60) Provisional application No. 62/761,075, filed on Mar. 12, 2018.

(51) Int. Cl.
*F16L 55/16* (2006.01)
*F16L 55/168* (2006.01)

(52) U.S. Cl.
CPC ....... *F16L 55/1612* (2013.01); *F16L 55/1683* (2013.01)

(58) Field of Classification Search
CPC . F16L 55/168; F16L 55/1683; F16L 55/1612; Y10T 29/49719
USPC .................................. 138/99, 97; 29/402.02
See application file for complete search history.

(56) References Cited

U.S. PATENT DOCUMENTS

| 614,547 A | 11/1898 | Haworth | |
|---|---|---|---|
| 633,537 A | 9/1899 | Stewart | |
| 1,154,376 A | 9/1915 | Claiborne | |
| 1,307,755 A | 6/1919 | Ross | |
| 1,340,167 A | 5/1920 | Harvey | |
| 1,797,766 A | 4/1928 | Frye | |
| 1,768,456 A | 6/1930 | Smith | |
| 2,098,556 A | 11/1937 | Tamada | |
| 2,577,586 A | 12/1951 | Maguire | |
| 3,562,467 A * | 2/1971 | Mooradian | .......... H01H 11/045 200/268 |
| 4,034,471 A * | 7/1977 | Bias | ....................... H01R 4/028 29/842 |
| 4,109,684 A | 8/1978 | Fernandez | |
| 4,487,096 A * | 12/1984 | Randall | ............... B25B 27/0014 72/114 |

(Continued)

FOREIGN PATENT DOCUMENTS

| CN | 201053425 | 4/2008 |
|---|---|---|
| CN | 201065214 | 5/2008 |

(Continued)

*Primary Examiner* — Patrick F Brinson
(74) *Attorney, Agent, or Firm* — Honigman LLP

(57) ABSTRACT

The present disclosure provides an assembly including a base structure, a pinhole patch and solder. The base structure includes a body that defines a pinhole. The pinhole patch extends at least partially into and at least partially fills the pinhole. An outer surface of the pinhole patch is disposed adjacent and is mechanically joined to a pinhole surface that defines the pinhole. The solder is disposed over at least a portion of the outer surface of the pinhole patch that bonds the pinhole patch at least to the pinhole surface that defines the pinhole. A subassembly is also disclosed. The subassembly includes a pinhole patch and flux.

11 Claims, 25 Drawing Sheets

(56) References Cited

U.S. PATENT DOCUMENTS

| | | | |
|---|---|---|---|
| 4,574,971 A | | 3/1986 | Leonard |
| 4,715,236 A | | 12/1987 | Willert |
| 5,262,197 A | | 11/1993 | Pollizzi |
| 5,741,099 A | * | 4/1998 | Aasgaard ............... B21J 15/048 |
| | | | 29/525.06 |
| 5,915,901 A | * | 6/1999 | Aasgaard ............... B29C 65/602 |
| | | | 411/107 |
| 6,015,252 A | | 1/2000 | Peck |
| 7,409,969 B2 | * | 8/2008 | Monk ................... F16L 55/168 |
| | | | 138/97 |
| 7,624,760 B2 | * | 12/2009 | Monk ................... F16L 55/168 |
| | | | 138/97 |
| 7,740,028 B1 | | 6/2010 | Wilson et al. |
| 7,954,517 B1 | * | 6/2011 | Marinelli ............... F16L 55/168 |
| | | | 138/97 |
| 8,403,007 B1 | * | 3/2013 | Marinelli ............... F16L 55/168 |
| | | | 138/97 |
| 9,933,103 B1 | | 4/2018 | Fink |
| 2010/0034615 A1 | * | 2/2010 | Mori ................... C10M 173/02 |
| | | | 411/387.4 |

FOREIGN PATENT DOCUMENTS

| | | | |
|---|---|---|---|
| CN | 103464963 | | 12/2013 |
| CN | 104088404 | | 10/2014 |
| DE | 69114017 | | 2/1997 |
| DE | 20100542 | | 4/2001 |
| GB | 153969 | | 11/1920 |
| JP | 1285833 | | 11/1989 |
| JP | 2004036646 | | 2/2004 |
| JP | 2005036962 A | * | 2/2005 |
| JP | 2009236401 | | 10/2009 |
| KR | 2017071721 | | 6/2017 |
| WO | 2002097214 | | 12/2002 |

* cited by examiner

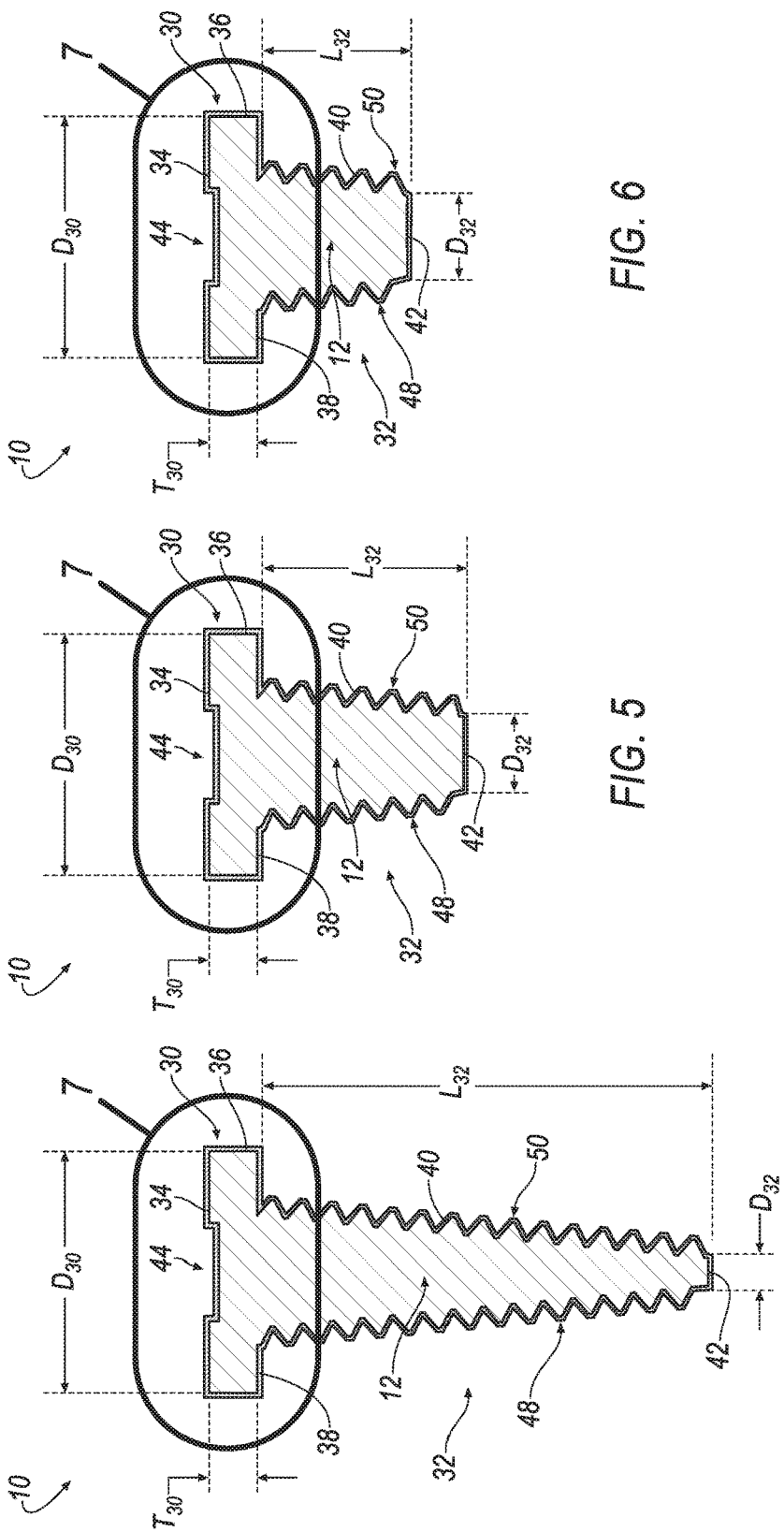

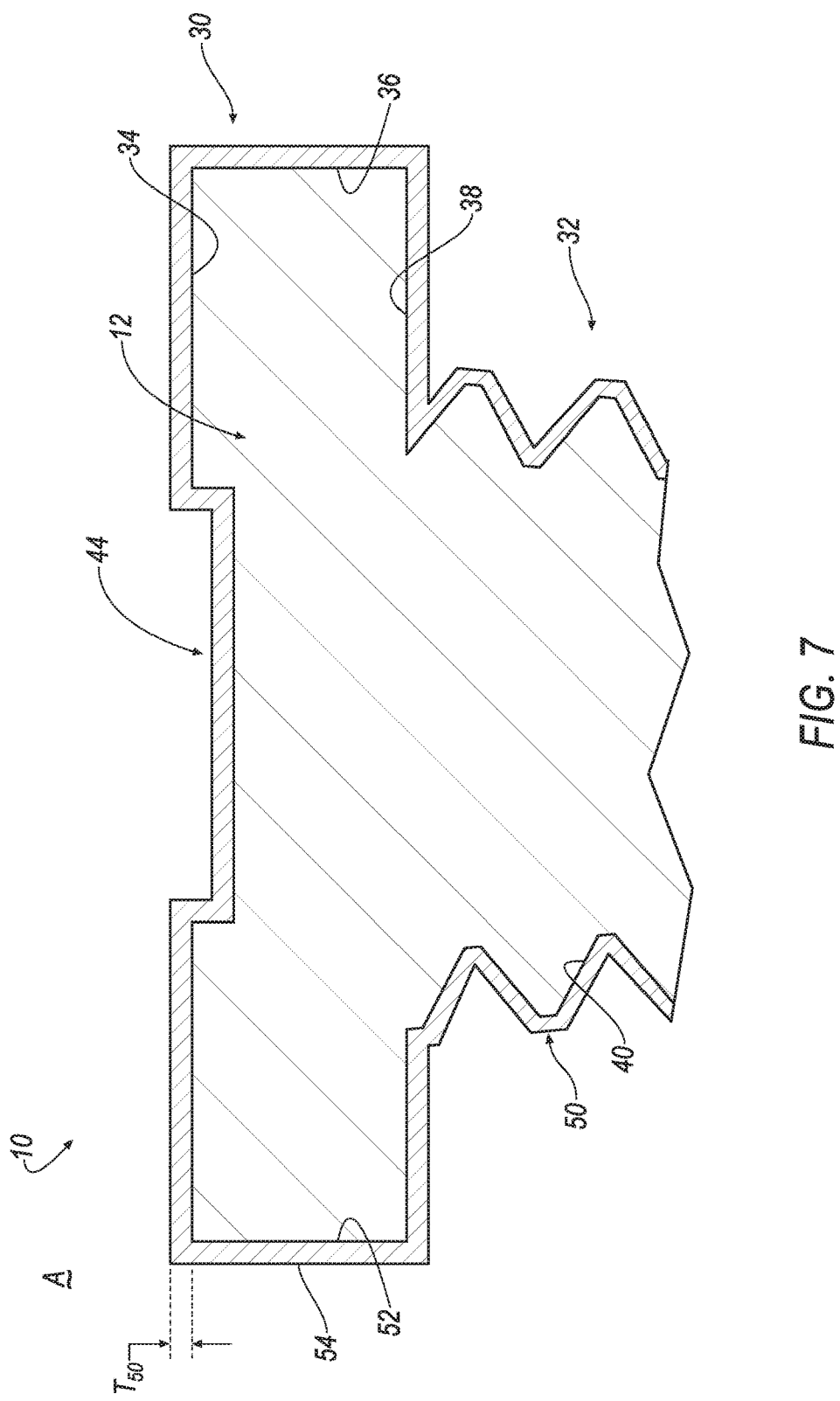

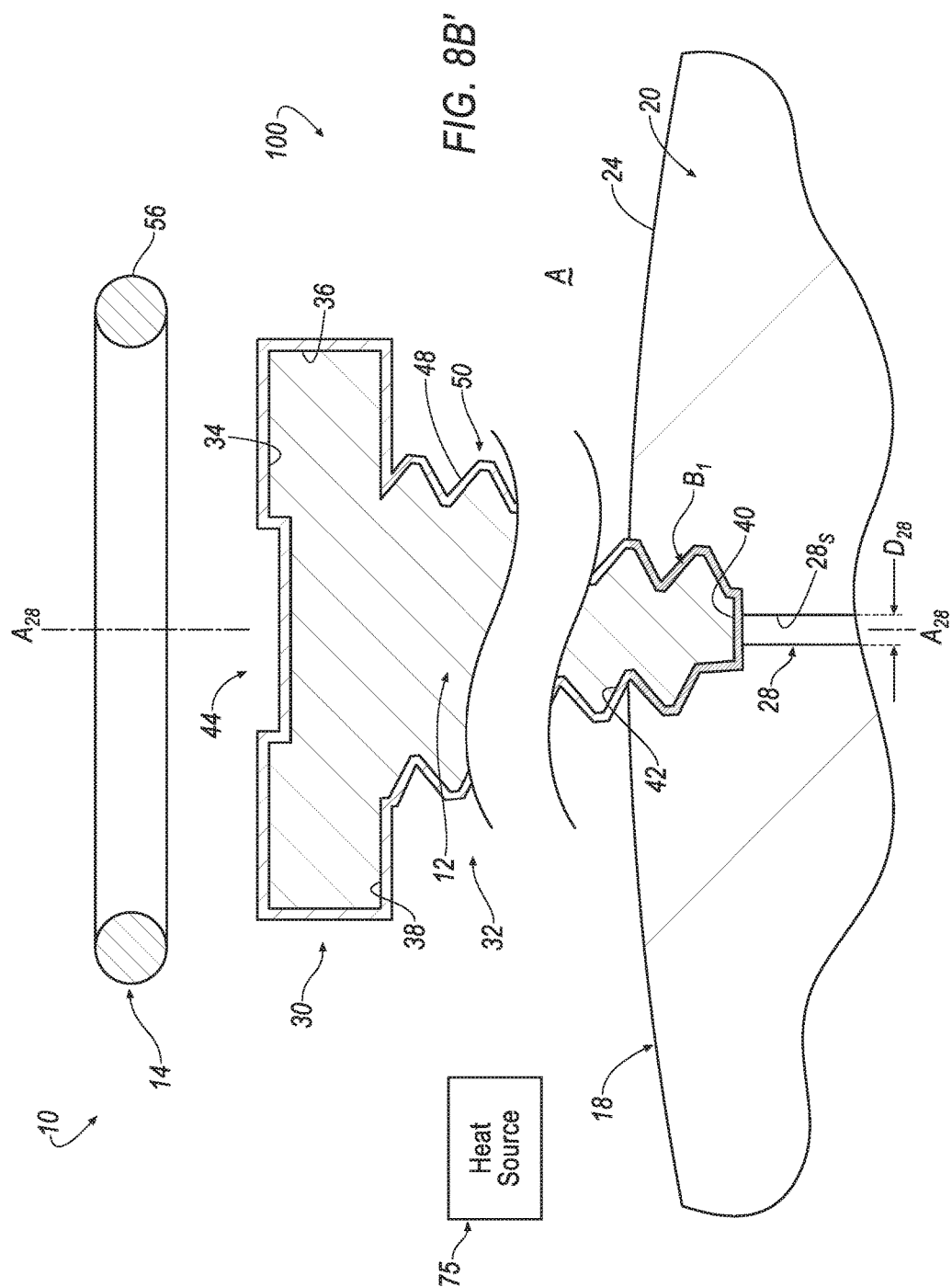

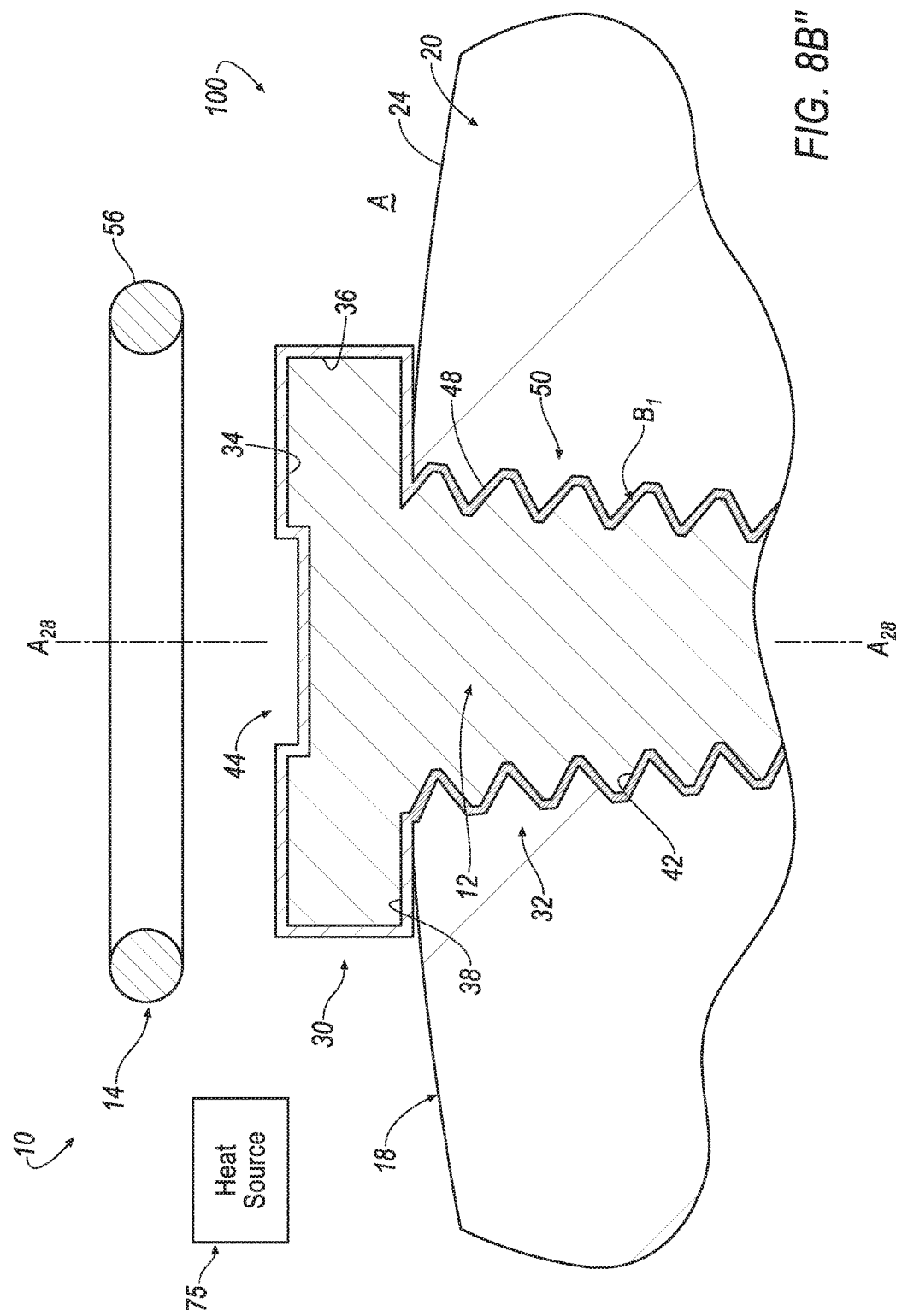
FIG. 8B"

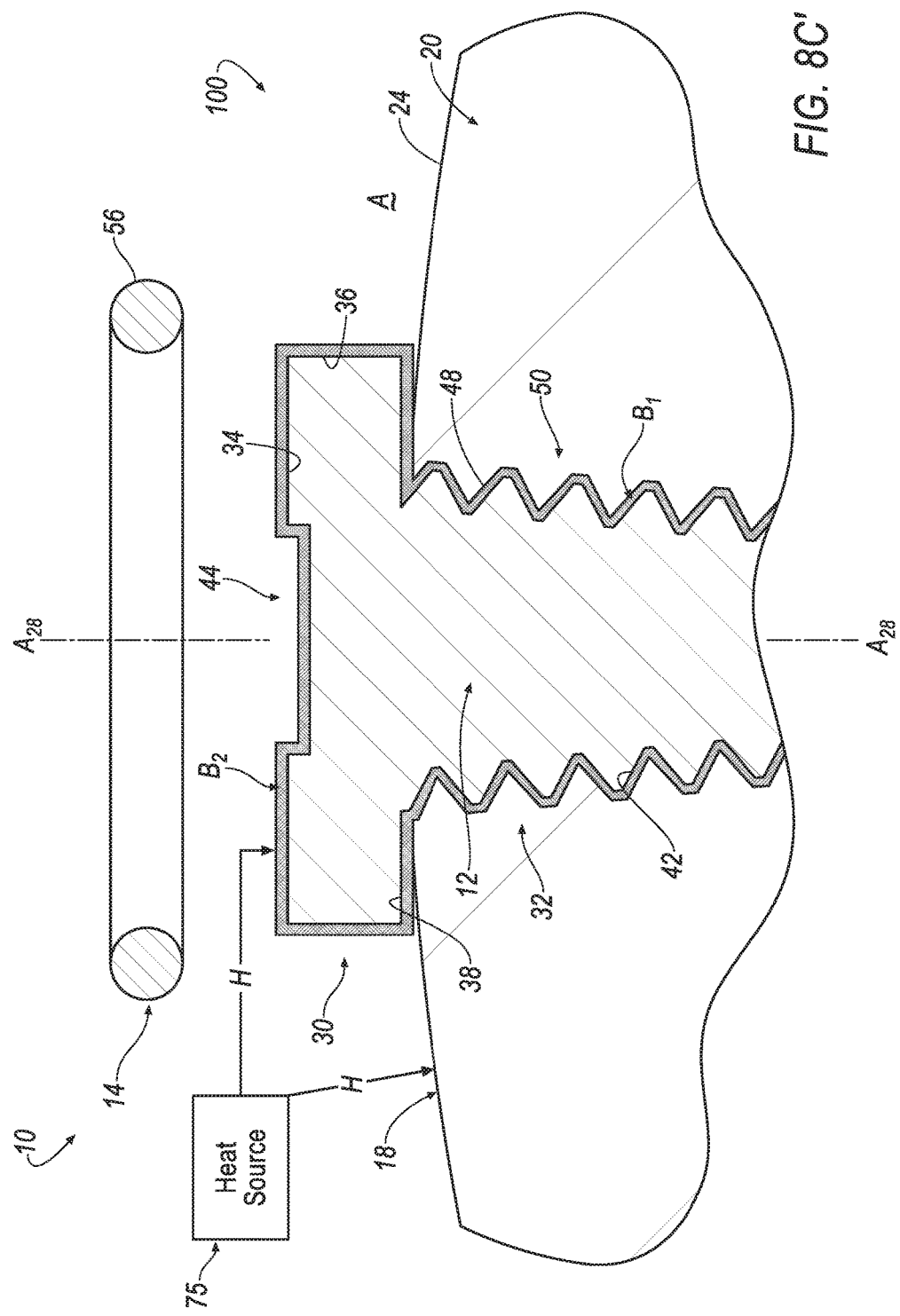

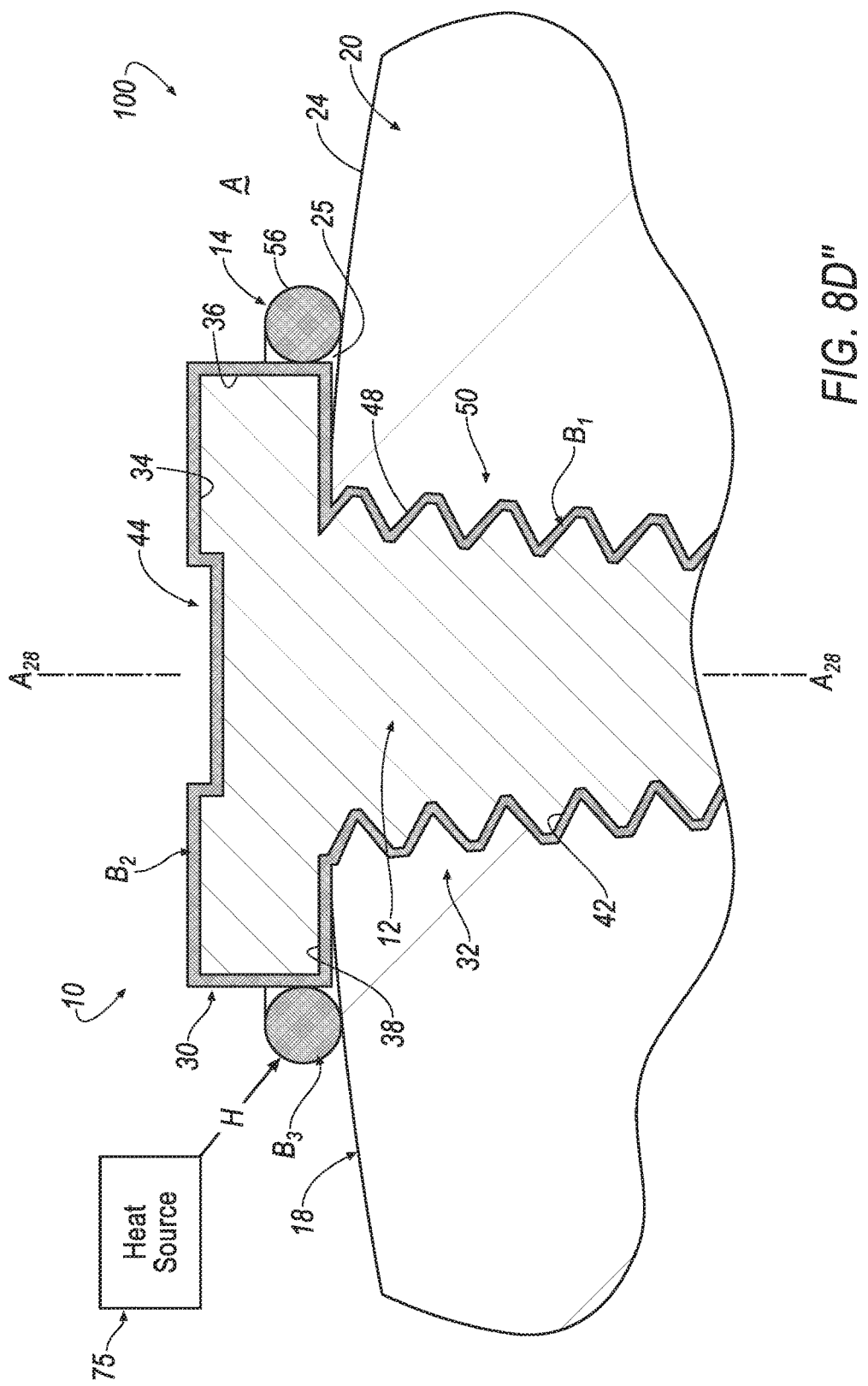

COPPER PLUMBING PINHOLE PREVENTION; PINHOLE REPAIR AND PROTECTION FOR LONG LIFE OF COPPER PLUMBING

CROSS REFERENCE TO RELATED APPLICATIONS

This U.S. patent application claims priority under 35 U.S.C. § 119(e) to U.S. Provisional Application 62/761,075, filed on Mar. 12, 2018. The disclosure of which is considered part of the disclosure of this application and are hereby incorporated by reference in its entirety.

TECHNICAL FIELD

This invention related to potable water delivery systems, and more specifically, systems and method for prevention of the interior corrosion of the iron and copper components of the system by the chemical redox reaction between the protective concentration of disinfection chemicals in the potable water and interior of the pipes. When it occurs, the exterior corrosion tends to be wide spread over the exterior surface, whereas the interior corrosion tends to be very localized resulting in pits and eventually pinholes in the pipe wall.

The corrosion protection method of the potable water infra-structure is an integrated system of cathodic corrosion protection for the exterior of the pipe and a potentially controlled chemical redox reaction for the interior of the pipe.

BACKGROUND

I, Frank Seth Gaunce, have invented a system to prevent portable water distribution systems from corrosion by the protective concentration of disinfecting chemicals that are intentionally left in the potable water to protect it during its delivery to point of use. Typically, the distribution systems are comprised of an iron main and distribution lateral of lead or copper, to point of use.

The disinfecting chemicals (disinfectants) will corrode all the metals of the distribution systems, even at the low protective concentrations (<1 to 4 PPMs) of disinfectants. The metals are corroded in the order: iron, lead, copper, which is the order of their metal reduction potentials. So long as they are electrically connected, the top metal will prevent the corrosion of all of the metals lower in the sequence. Lead and copper, are not protected, electro-chemically, from corrosion by the disinfectants, when the iron mains are removed or corroded away and replaced with plastic mains.

With the lead pipes, the corrosion is over the entire interior surface, and is evidenced by an unacceptable increase of the lead concentration in the delivered portable water. In the case of copper, the corrosion tends to be very local, resulting in pipe pinhole water leaks.

Where the iron mains are replaced with electrically non-conducting plastic mains the copper and the lead laterals are corroded, but can be protected by providing a potential source of at least the equivalent of the reduction potential of iron. In the case of lead, the corrosion will stop and the lead contamination of the potable water will cease. In the case of copper, the copper corrosion will cease but the corroded pinholes remain necessitating a repair action before the lateral can be used to deliver water.

At this time the generally accepted method to deal with pinholes in copper plumbing is to replace the copper plumbing with plastic plumbing. This is a very invasive and costly action which has negative, but generally acceptable consequences. It reduces the maximum allowable operating pressure of the system. It also removes from the system the desirable anti-bacteria characteristic of copper.

SUMMARY

My claimed method to protect copper plumbing from corrosion (when the iron mains are replaced with plastic) and method to repair the copper pinholes that developed during the time that the copper was disconnected from the iron mains, follows.

To prevent the development of pinholes when the iron mains are replaced with plastic mains connected the copper plumbing is to connect a potential source to the copper, such as an iron or zinc anode. In some approaches, this needs to be done before disconnecting the iron main from the copper lateral. When this is done, the plastic main may be connected to the protected copper. And if the copper is corrosion pinhole free, it will continue to remain corrosion pinhole free and remain in place. Should pinholes have already developed, they can be repaired by removing the section of the pipe that contains the pinhole and replacing with a leak free section of pipe. Alternatively, the hole can be closed by inserting an appropriately sized tinned self-tapping metal screw into the pinhole and securely soldering its head to the outside of the pipe. Another method is to solder a tinned metal disk, formed to the outside radius of the pipe, over the hole. The disk may have a pip on the inside curvature to assist its positioning over the hole.

When the repairs are completed they will be protected as with the original pipe. The repaired pipe can remain in place and continue to serve its original purpose.

This protection and repair of the original copper installation forestalls the need to replace it with plastic plumbing thereby avoiding a large capital expenditure.

It should be noted that all repairs must be gas tight to forestall future leaks and serious corrosion of the pipe's exterior.

I claim:

1. This method of protecting existing copper plumbing and new copper plumbing when connected to a plastic main.
2. Tinned metal self-tapping screws for pinhole patching.
3. Tinned metal disks to cover the pinhole leaks.
4. Tinned metal disks formed to the outside radius of the pipe or fixture.
5. A pip formed and tinned on the inside of the tinned metal disks.
6. A tinned metal plug sized to be forced into a pinhole.
7. All patches will be securely soldered to the exterior of the copper fixture.
8. All patches will be made gas tight to avoid future exterior corrosion.
9. A source of electric potential such as a base metal anode or an AC/DC rectifier transformer connected to the electric grid.
10. That by these actions the need to replace existing copper plumbing with plastic plumbing and attendant cost is avoided.

In one aspect, this disclosure provides an assembly of a base structure including a body that defines a pinhole; a pinhole patch that extends at least partially into and at least partially fills the pinhole, and wherein an outer surface of the pinhole patch is disposed adjacent and is mechanically joined to a pinhole surface that defines the pinhole. The assembly also includes a solder coating disposed over at least a portion of the outer surface of the pinhole patch that bonds the pinhole patch at least to the pinhole surface that defines the pinhole.

In other aspects, the assembly of the previous paragraph may also include optional features in any combination. These optional features include: wherein the base structure is a pipe, wherein the body is tube-shaped and includes an inner surface and an outer surface, wherein the body is defined by a thickness extending between the inner surface and the outer surface, wherein the inner surface defines a fluid-flow passage, wherein the pinhole extends though thickness; and/or wherein the pinhole patch extends through the pinhole and beyond the inner surface of the tube-shaped body of the pipe; and/or wherein the pinhole patch extends through the pinhole, wherein the pinhole patch includes a lower surface that is aligned with the inner surface of the tube-shaped body of the pipe and does not extend beyond the inner surface of the tube-shaped body of the pipe; and/or wherein the pinhole patch extends through the pinhole, wherein the pinhole patch includes a lower surface that is recessed within the pinhole and does not extend beyond the inner surface of the tube-shaped body of the pipe; and/or wherein the tube-shaped body of the pipe includes an upstream end, a downstream end and a curved portion that is downstream of the upstream end and upstream of the downstream end; and/or wherein the pinhole is formed upstream of the curved portion; and/or wherein the pinhole is formed downstream of the curved portion; and/or wherein the pinhole is formed by the curved portion; and/or a self-tapping helical thread extending from a portion of the outer surface of the pinhole patch; and/or an implement-receiving recess formed in a head portion of the pinhole patch that is sized for receiving a fastening implement; and/or a separate length of solder at least partially surrounding the head portion of the pinhole patch that bonds the head portion of the pinhole patch to the outer surface of the tube-shaped body of the pipe.

In yet another aspect, this disclosure describes a subassembly that is sized for arrangement within a pinhole defined by a pinhole surface formed by a tube-shaped body defining a pipe having a fluid-flow passage. The subassembly comprising a pinhole patch including a head portion; and a neck portion extending from the head portion, wherein the neck portion is configured to extend at least partially into and is configured to at least partially fill the pinhole, wherein an outer surface of the neck portion of the pinhole patch is configured for being mechanically joined to the pinhole surface; a solder coating disposed over at least a portion of the outer surface of at least the outer surface of the neck portion of the pinhole patch, wherein the solder coating is configured to bond the outer surface of the neck portion of the pinhole patch to the pinhole surface.

In other aspects, the subassembly of the previous paragraph may also include optional features in any combination. These optional features include: wherein the solder coating is further disposed over a lower surface of the head portion of the pinhole patch, wherein the solder coating is configured to bond the lower surface of the head portion of the pinhole patch to an outer surface of the tube-shaped body defining the pip; and/or a self-tapping helical thread extending from a portion of the outer surface of the pinhole patch; and/or an implement-receiving recess formed in a head portion of the pinhole patch that is sized for receiving a fastening implement; and/or a length of separate solder at least partially surrounding the head portion of the pinhole patch that bonds the head portion of the pinhole patch to the outer surface of the tube-shaped body of the pipe.

These as well as other aspects, advantages, and alternatives will become apparent to those of ordinary skill in the art by reading the following detailed description, with reference where appropriate to the accompanying drawings.

DESCRIPTION OF DRAWINGS

FIG. 4 is a cross-sectional view of an example pinhole patch.

FIG. 5 is a cross-sectional view of an example pinhole patch.

FIG. 6 is a cross-sectional view of an example pinhole patch.

FIG. 7 is an enlarged view of the pinhole patch according to line 7 of any of FIGS. 4-6.

FIG. 8A' is an enlarged view according to line 8A' of FIG. 8A.

FIG. 8B' is an enlarged view according to line 8B' of FIG. 8B.

FIG. 8B" is another enlarged view according referenced from line 8B' of FIG. 8B.

FIG. 8C' is an enlarged view according to line 8C' of FIG. 8C.

FIG. 8D' is an enlarged view according to line 8D' of FIG. 8D.

FIG. 8D" is another enlarged view according referenced from line 8D' of FIG. 8D.

FIG. 8E' is an enlarged view according to line 8E' of FIG. 8E.

FIG. 10' is an enlarged view according to line 10' of FIG. 10.

FIG. 11' is an enlarged view according to line 11' of FIG. 11.

FIG. 12' is an enlarged view according to line 12' of FIG. 12.

FIG. 13' is an enlarged view according to line 13' of FIG. 13.

Like reference symbols in the various drawings indicate like elements.

DETAILED DESCRIPTION

Figure 1A:
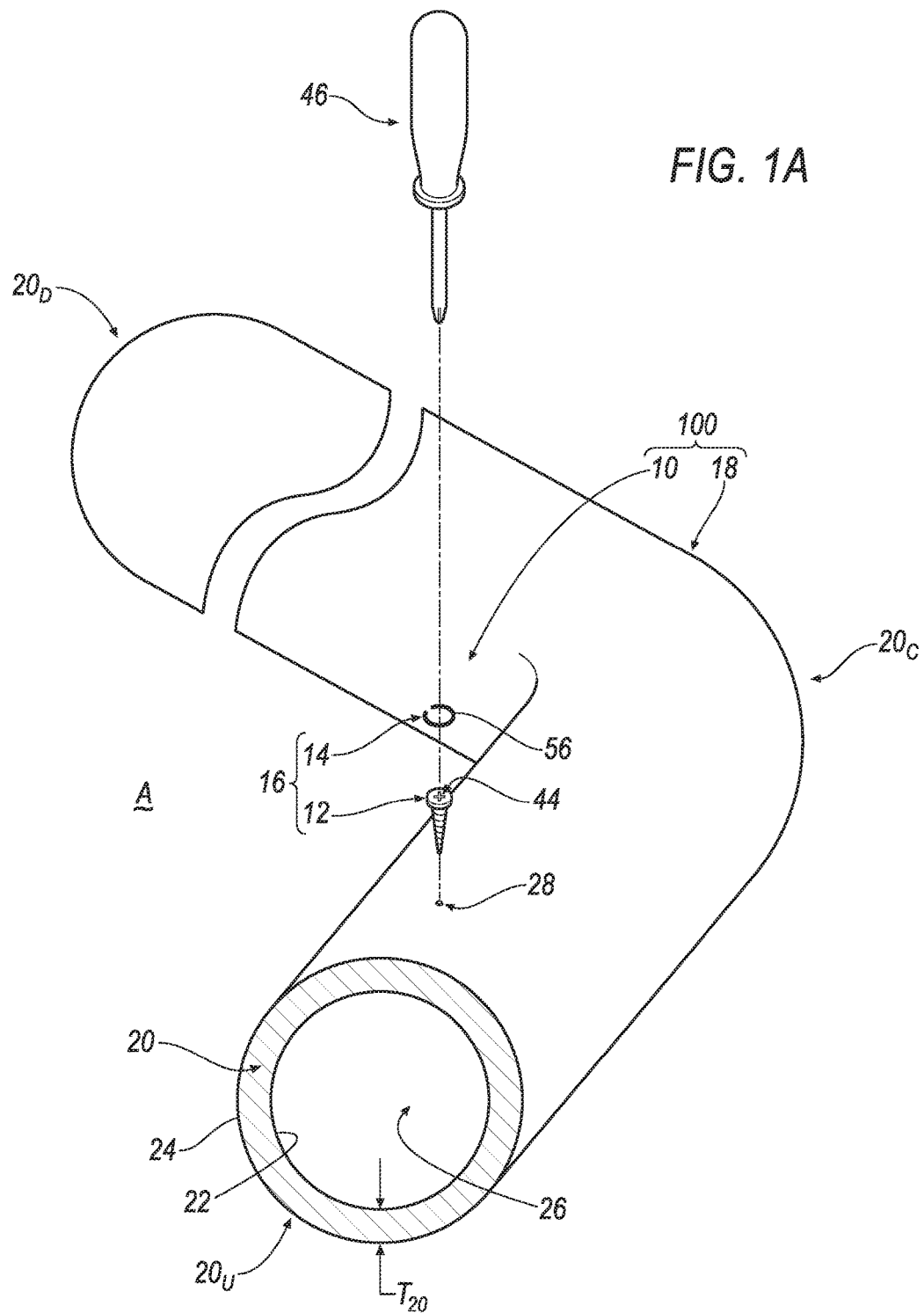
FIG. 1A is an exploded perspective view of an assembly including a pipe forming a pinhole and an example pinhole patch.
Figure 1B:
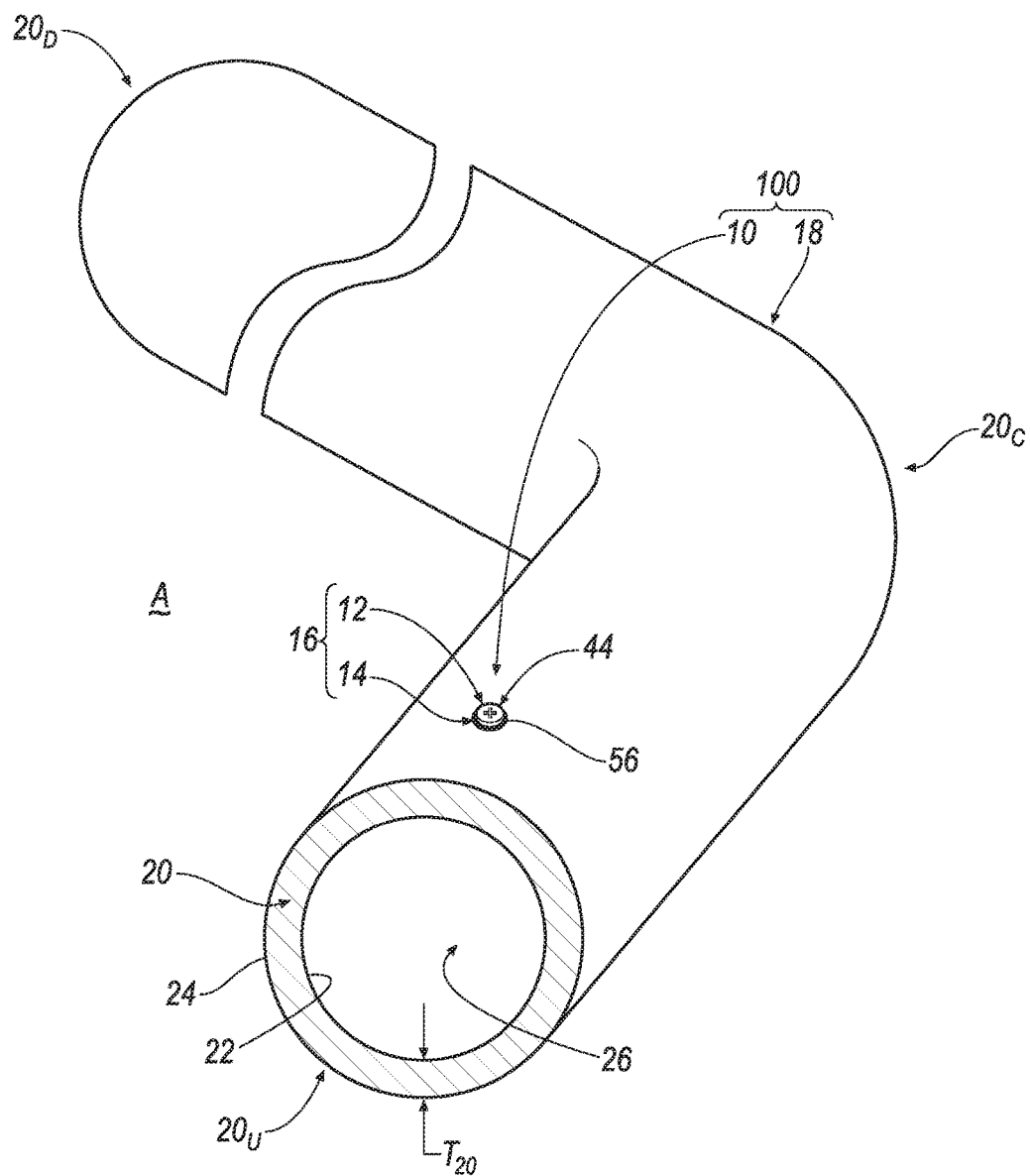
FIG. 1B is an assembled perspective view of the assembly of FIG. 1A.
Figure 2A:
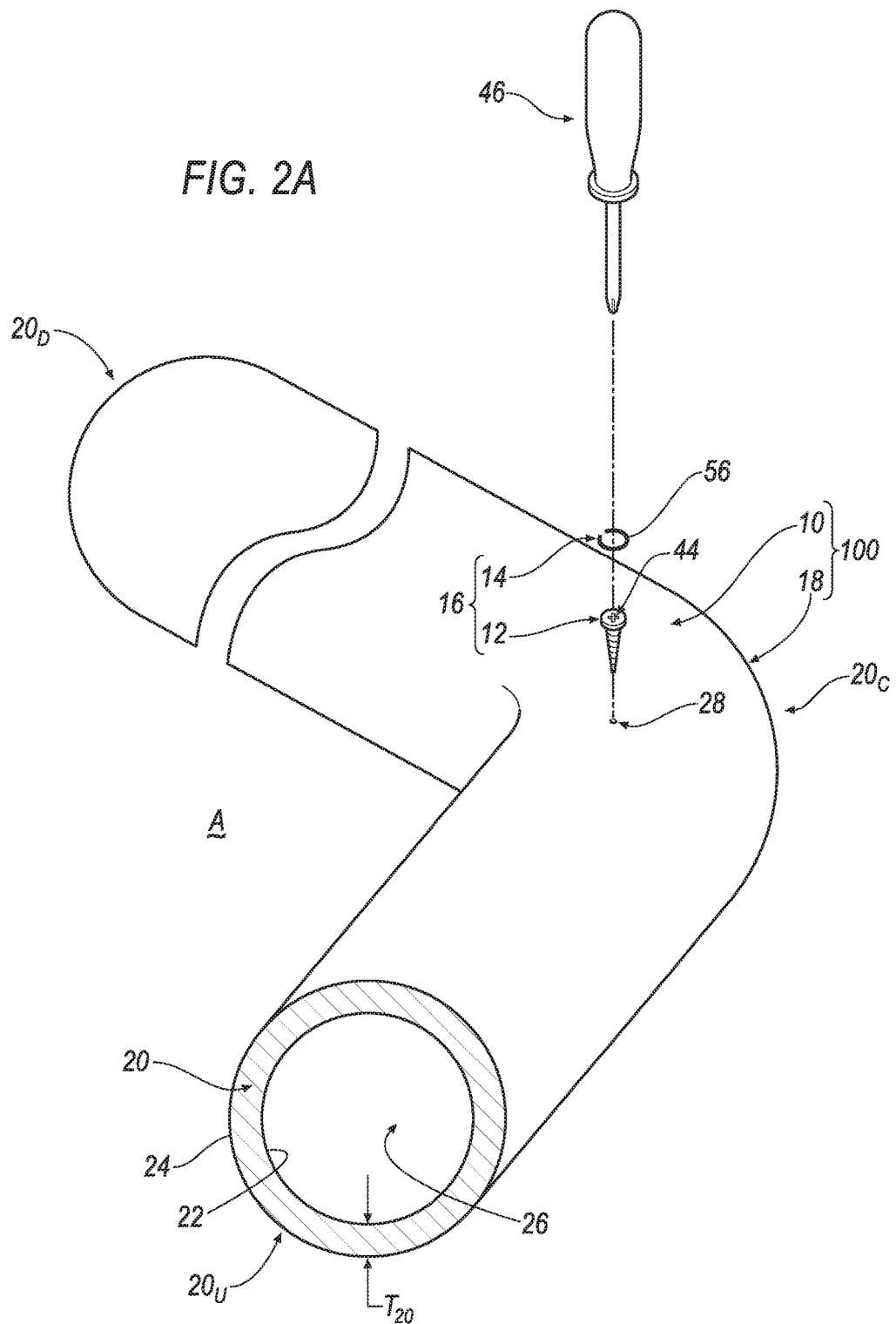
FIG. 2A is an exploded perspective view of an assembly including a pipe forming a pinhole and an example pinhole patch.
Figure 2B:
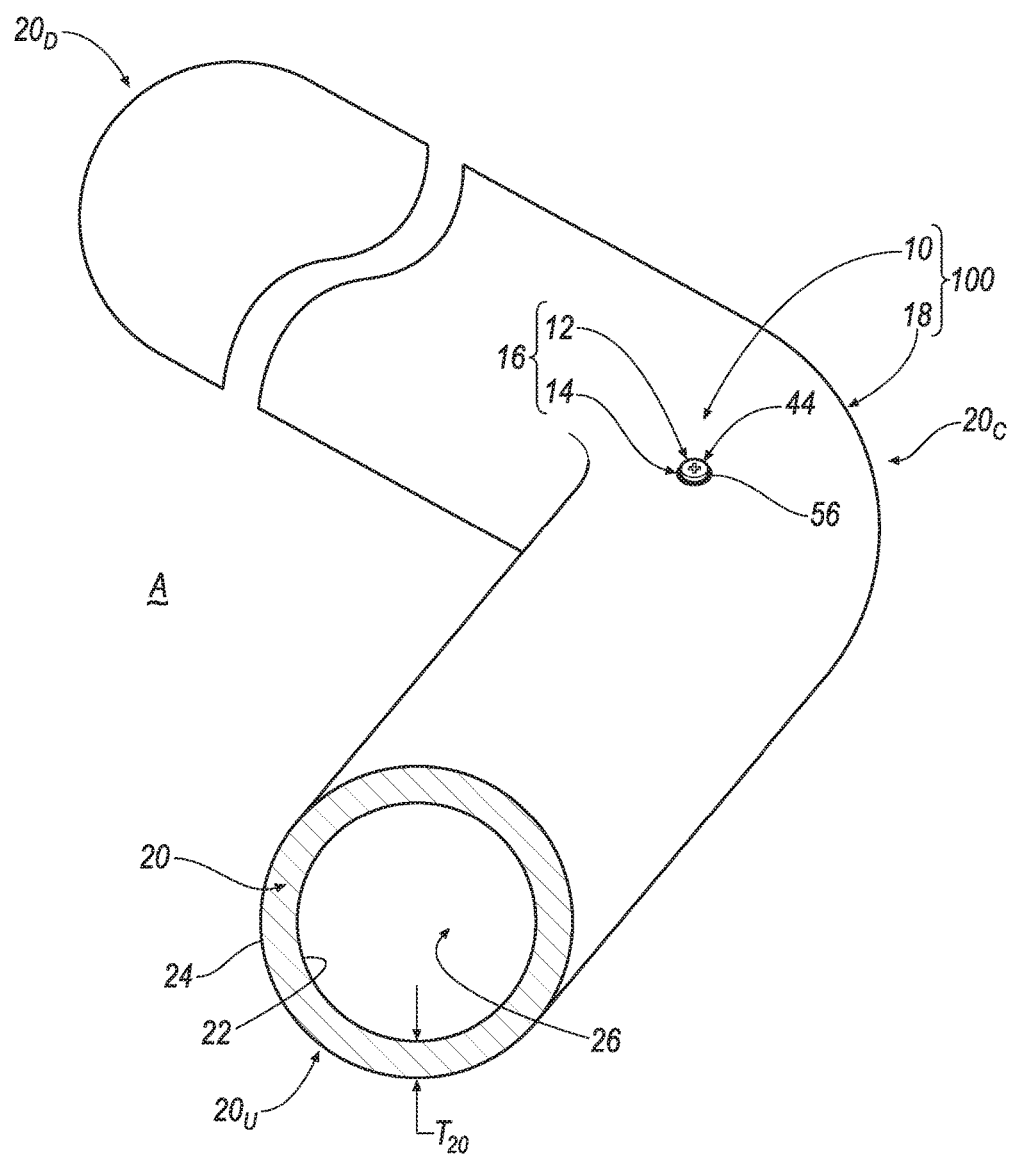
FIG. 2B is an assembled perspective view of the assembly of FIG. 2A.
Figure 3A:
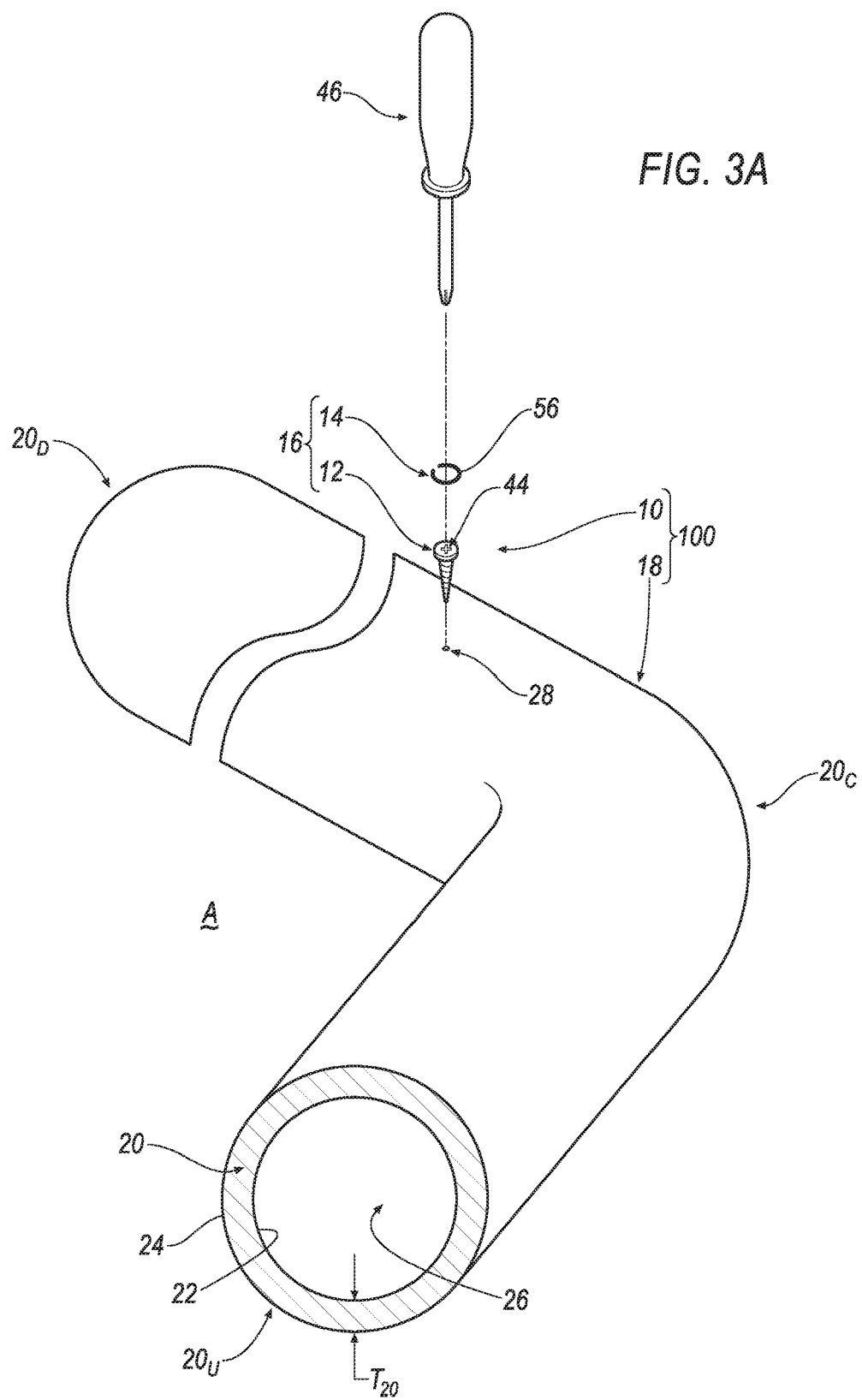
FIG. 3A is an exploded perspective view of an assembly including a pipe forming a pinhole and an example pinhole patch.
Figure 3B:
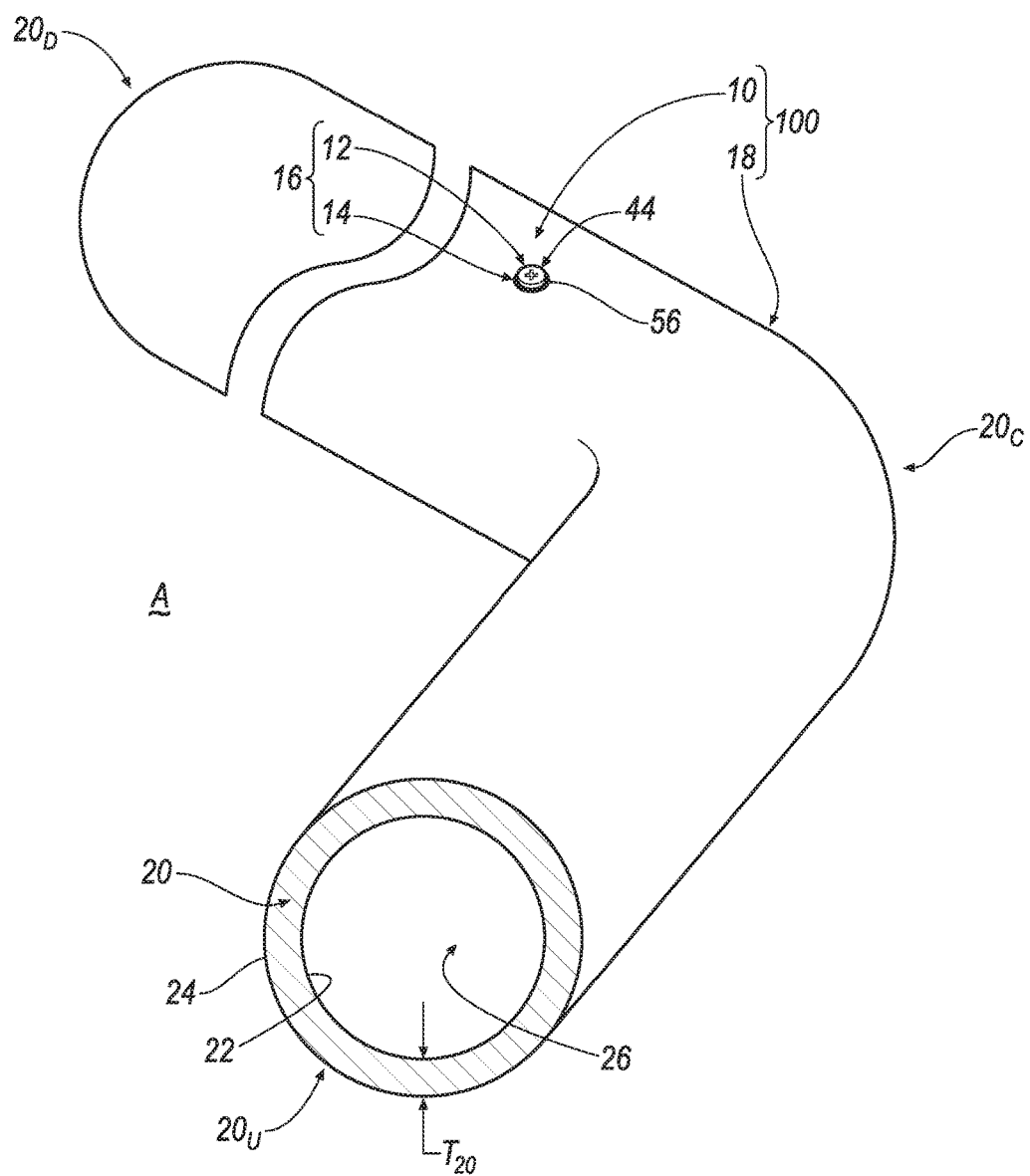
FIG. 3B is an assembled perspective view of the assembly of FIG. 3A.

The present disclosure relates to methods, systems, and assemblies to repair pinholes after they have developed in a pipeline. In one approach, the assemblies herein include an appropriately sized tinned, flux-coated, solder-coated, and the like self-tapping pinhole patch, which may be a self-tapping screw. A "pinhole" generally defines a relatively small or narrow fluid passageway (e.g., a fluid passageway having a shape that may resemble a diameter between approximately about 0.01 to about 0.25 inches) formed by a base structure, such as within a copper pipe wall. The term "patch" as described in the following disclosure implies repair of damage of the base structure. Accordingly, the term "pinhole patch" as described in the following disclosure is defined as a component or a subassembly that is sized for repairing pinhole-sized damage to a component forming a pinhole such that fluid is not permitted to pass through the relatively small or narrow fluid passageway formed by the base structure.

Referring to FIGS. 1A-1B, 2A-2B and 3A-3B an exemplary pinhole patch is shown generally at 10. In some implementations, the pinhole patch 10 includes a body 12. In other implementations, the pinhole patch 10 is defined by a subassembly 16 including a body 12 and an optional fluid seal 14.

With continued reference to FIGS. 1A-1B, 2A-2B and 3A-3B, a base structure is shown generally at 18 generally in the form of a pipeline, such as a copper pipeline. The base structure 18 is generally defined by a body 20 having an inner surface 22 and an outer surface 24. The body 20 is defined by a thickness $T_{20}$ extending between the inner surface 22 and the outer surface 24. The inner surface 22 defines a fluid-flow cavity 26 extending through the body 20 through which water or other fluid may flow.

The body 20 also defines a portion of the pipeline needing repair via a pinhole 28 extending through the thickness $T_{20}$ of the body 20 from the inner surface 22 to the outer surface 24. The pinhole 28 places the fluid-flow cavity 26 defined by the inner surface 22 of the body 20 in fluid communication with surrounding atmosphere A that surrounds the outer surface 24 of the body 20.

Figure 8A:
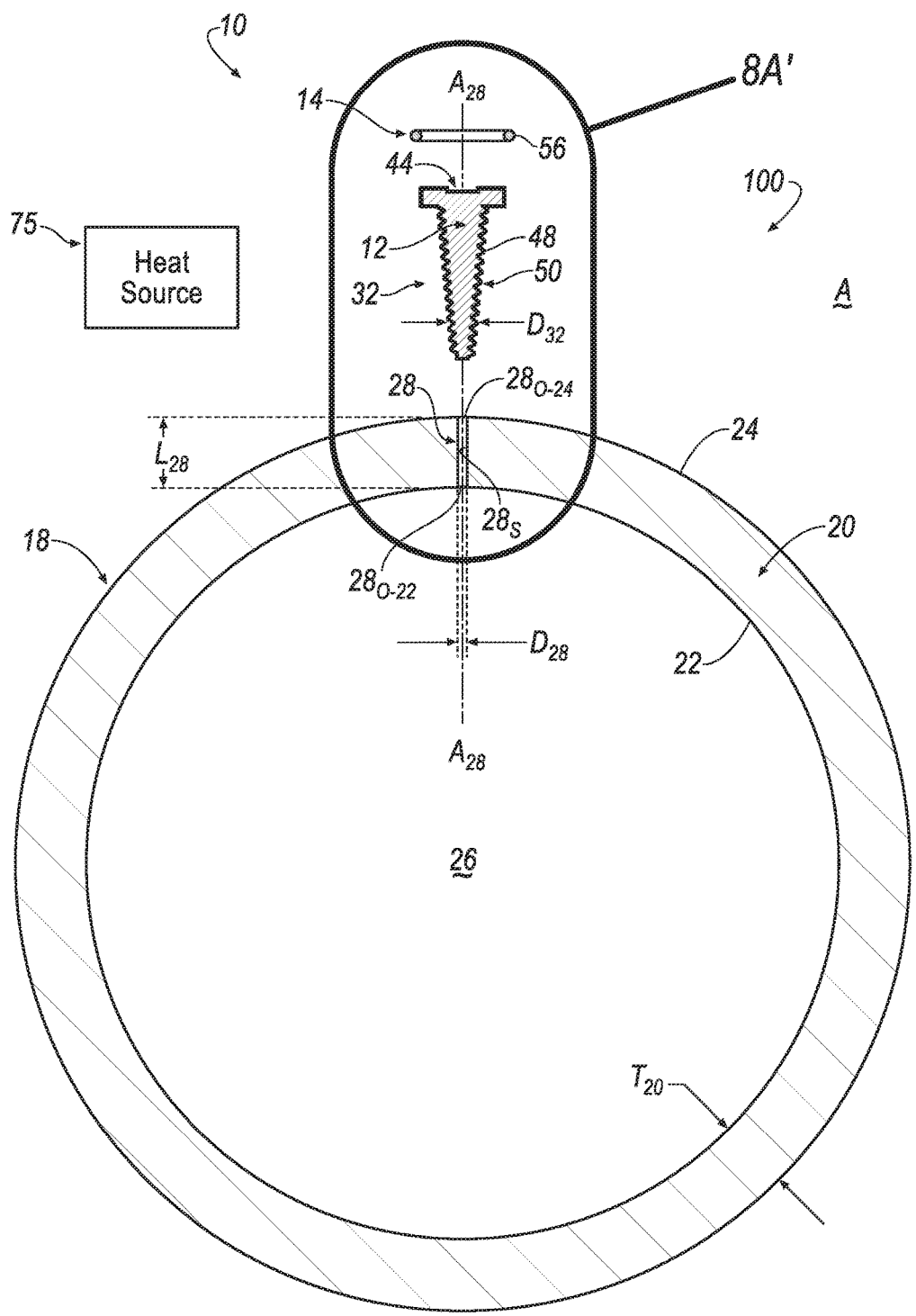
FIGS. 8A-8E illustrate steps for assembling the assembly of FIGS. 8A-8B.
Figure 8A:
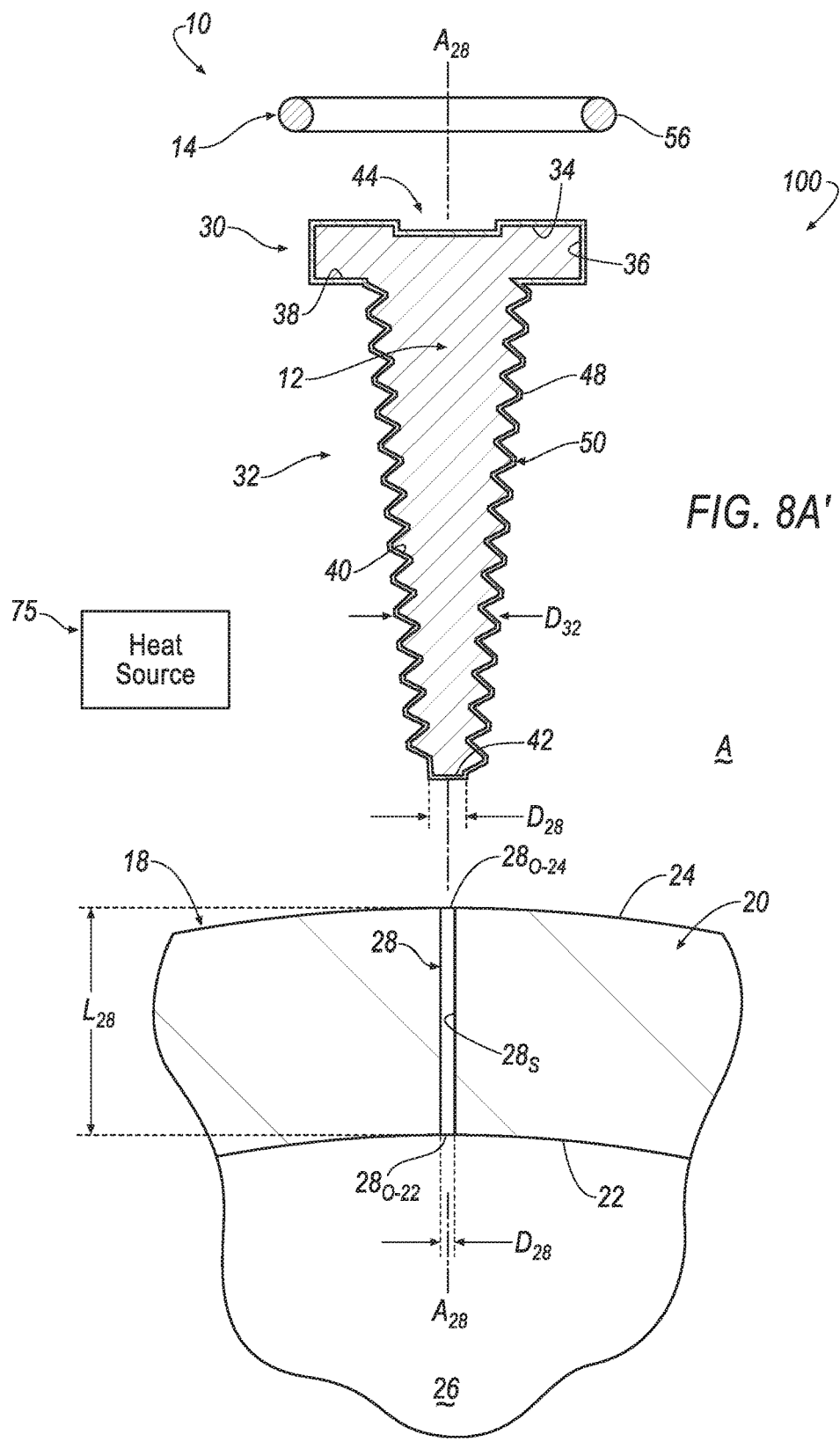

Referring to FIGS. 8A and 8A', the pinhole 28 may define a uniform or a non-uniform shape. In some examples, the pinhole 28 is defined by a pinhole surface $28_S$ that generally defines by a diameter $D_{28}$. The diameter $D_{28}$ defined by the pinhole 28 may range between approximately about 0.01 to about 0.25 inches or other ranges therewithin. Access to the unrepaired pinhole 28 is permitted by a first pinhole opening $28_{O-22}$ formed by the inner surface 22 of the body 20 of the base structure 18 and a second pinhole opening $28_{O-24}$ formed by the outer surface 24 of the body 20 of the base structure 18.

The pinhole 28 is not an originally-formed passageway provided by the base structure 18 at the time of the manufacture of the base structure 18. Accordingly, the pinhole 28 may arise from intentional or unintentional damage of the base structure 18. For example, the pinhole 28 may be the result of corrosion due to disinfecting chemicals in water flowing through the pipeline 18 in a potable water system in which a connected iron mainline has been replaced with plastic mainlines as generally described in co-pending US 2019/0040333A1, which is hereby incorporated herein by reference in its entirety. Therefore, the pinhole 28 may undesirably place the fluid-flow cavity 26 in fluid communication with surrounding atmosphere A thereby resulting in a leakage of fluid flowing within the fluid-flow cavity 26 to surrounding atmosphere A.

In some instances, the body 20 of the base structure 18 is defined by a tube shape, and, as such the body 20 may be alternatively-referred to as a "tube-shaped body." Furthermore, because the tube-shaped body 20 forms a fluid-flow cavity 26, the base structure 18 may be alternatively referred to as a "pipe or "pipeline." The fluid that flows through the fluid-flow cavity 26 may be potable water having residual levels (such as about 1 to about 4 ppm) of disinfection chemicals therein.

Although the body 20 may define the base structure 18 to be a pipe, the body 20 may have any desirable shape. In an example, the body 20 may be a planar surface or wall. Accordingly, the planar surface or wall may be a portion of a base structure 18 defining tank that retains a fluid. Furthermore, although the fluid flowing through the fluid-flow cavity 26 of the pipe 18 may be potable water, other types of fluid may flow through the fluid-flow cavity of the pipe 18. Therefore, although the following disclosure refers to the structure at reference numeral 18 as a "pipe," the following disclosure may also be applied to any desirable base structure that is not defined by a tube shape including a fluid-containing cavity or a fluid-flow passage 26.

In some instances, the pinhole 28 may form over time through the thickness $T_{20}$ of the body 20 of the pipe 18 in a radial direction from the inner surface 22 of the body 20 toward the outer surface 24 of the body 20. Initial formation of the pinhole 28 at the inner surface 22 of the body 20 may arise from the interior corrosion of a material (e.g., iron, lead, copper or the like) that is utilized in the manufacture of the body 20. In some examples, the pinhole 28 forms as a result of a chemical redox reaction between the protective concentration of disinfection chemicals in the potable water and the interior surface 22 of the body 20 as set forth in US 2019/0040533A1.

As seen in each of FIGS. 1A-1B, 2A-2B and 3A-3B, the body 20 includes an upstream end $20_U$ that generally defines an entryway for fluid to enter into the fluid-flow cavity 26 and a downstream end $20_D$ that generally defines an exit for fluid exiting the fluid-flow cavity 26. The body 20 may also define a curved portion $20_C$ of the body 20 that is downstream of the upstream end $20_U$ of the body 20 and upstream of the downstream end $20_D$. The pipeline 18 may be any pipeline structure, home or other building.

The pinhole 28 may form anywhere along a length of a body 20 such as, for example: (1) upstream of the curved portion $20_C$ of the body 20 (as seen at, e.g., FIGS. 1A-1B); (2) at or along any portion of the body 20 defining the curved portion $20_C$ of the body 20 (as seen at, e.g., FIGS. 2A-2B); and (3) downstream of the curved portion $20_C$ of the body 20 (as seen at, e.g., FIGS. 3A-3B). In some instances, the pinhole 28 may form at or along any portion of the body 20 defining the curved portion $20_C$ of the body 20 (as seen at, e.g., FIGS. 2A-2B) as a result of, for example, a combination of the chemical redox reaction described above and cavitation of the potable water flowing about the curved portion $20_C$ of the body 20.

Referring to FIGS. 4-6, exemplary pinhole patches are discussed. In one approach, the body 12 of the pinhole patch 10 is generally defined by a head portion 30 and a neck portion 32. The body 12 may be formed from any desirable material such as, for example, tin, sheet metal, steel, stainless steel, aluminum, copper, iron or the like.

The head portion 30 includes an upper surface 34, a side surface 36 and a lower surface 38. The neck portion 32 extends from the lower surface 38 of the head portion 30. The neck portion 32 includes a side surface 40 and a lower surface 42.

The head portion 30 may include any desirable shape. In an example, the side surface 36 of the head portion 30 defines a diameter $D_{30}$ of the head portion 30. Furthermore, the head portion 30 may define a thickness $T_{30}$ extending between the upper surface 34 of the head portion 30 and the lower surface 38 of the head portion 30.

The neck portion 32 may include any desirable shape. In an example, the side surface 40 of the neck portion 32 defines a diameter $D_{32}$ of the neck portion 32. The diameter $D_{32}$ may be constant, or, as seen at FIGS. 4-6, may be non-constant, defining a conical shape that increases in diameter as the neck portion 32 extends from the lower surface 42 of the neck portion 32 toward the lower surface 38 of the head portion 30. Furthermore, the neck portion 32 may define a length $L_{32}$ extending between the lower surface 38 of the head portion 30 and the lower surface 42 of the neck portion 32.

In some instances, the body 12 of the pinhole patch 10 may define or resemble a threaded fastener (e.g., a screw and/or a self-tapping screw). Accordingly, the upper surface 34 of the head portion 30 may define an implement-receiving recess 44 (see, e.g., FIGS. 1A-1B, 2A-2B, 3A-3B and 8) that is sized for receiving, for example, a fastening implement 46 (see, e.g., 1A-1B, 2A-2B and 3A-3B) such as, for example, a Phillips screw-driver, a flat-head screw-driver, an Allen wrench, hex key or the like. Furthermore, the side surface 40 of the neck portion 32 may include a helical thread 48; accordingly the neck portion 32 may be alternatively referred to as a "threaded portion" of the pinhole patch 10. Furthermore, the threaded portion 32 of the pinhole patch 10 may result in the pinhole patch 10 being a self-tapping component that taps the pinhole surface $28_S$ of the pinhole 28 such that the pinhole surface $28_S$ forms a corresponding threaded groove in the material of the body 20 that defines the pinhole passage 28.

Figure 10:
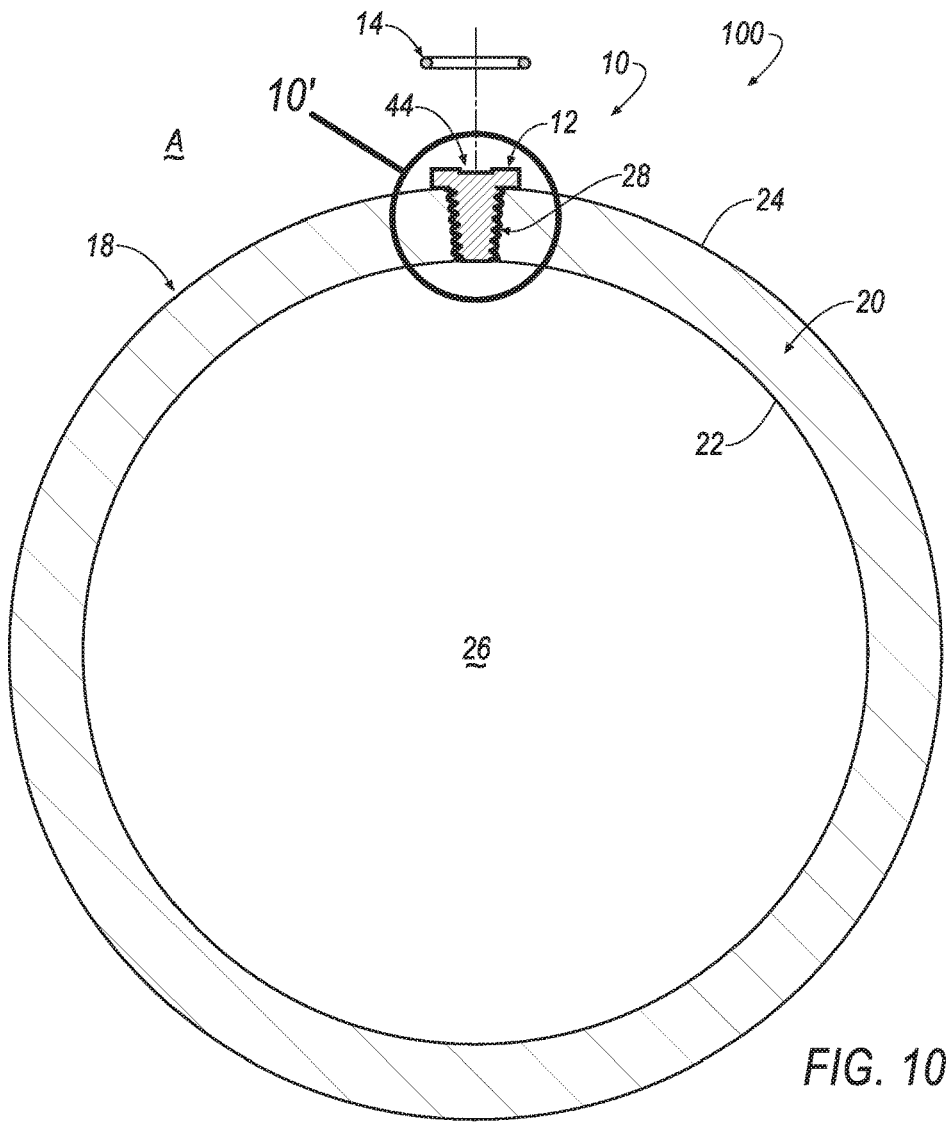
FIG. 10 is a view of an example assembly including the pinhole patch of FIG. 5.
Figure 10:
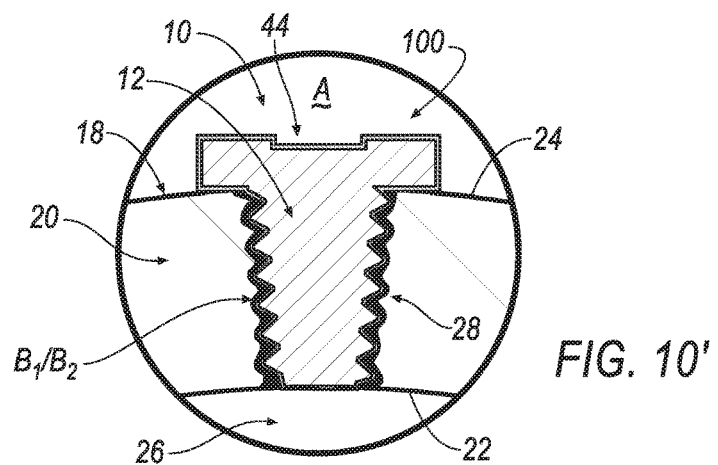
Figure 11:
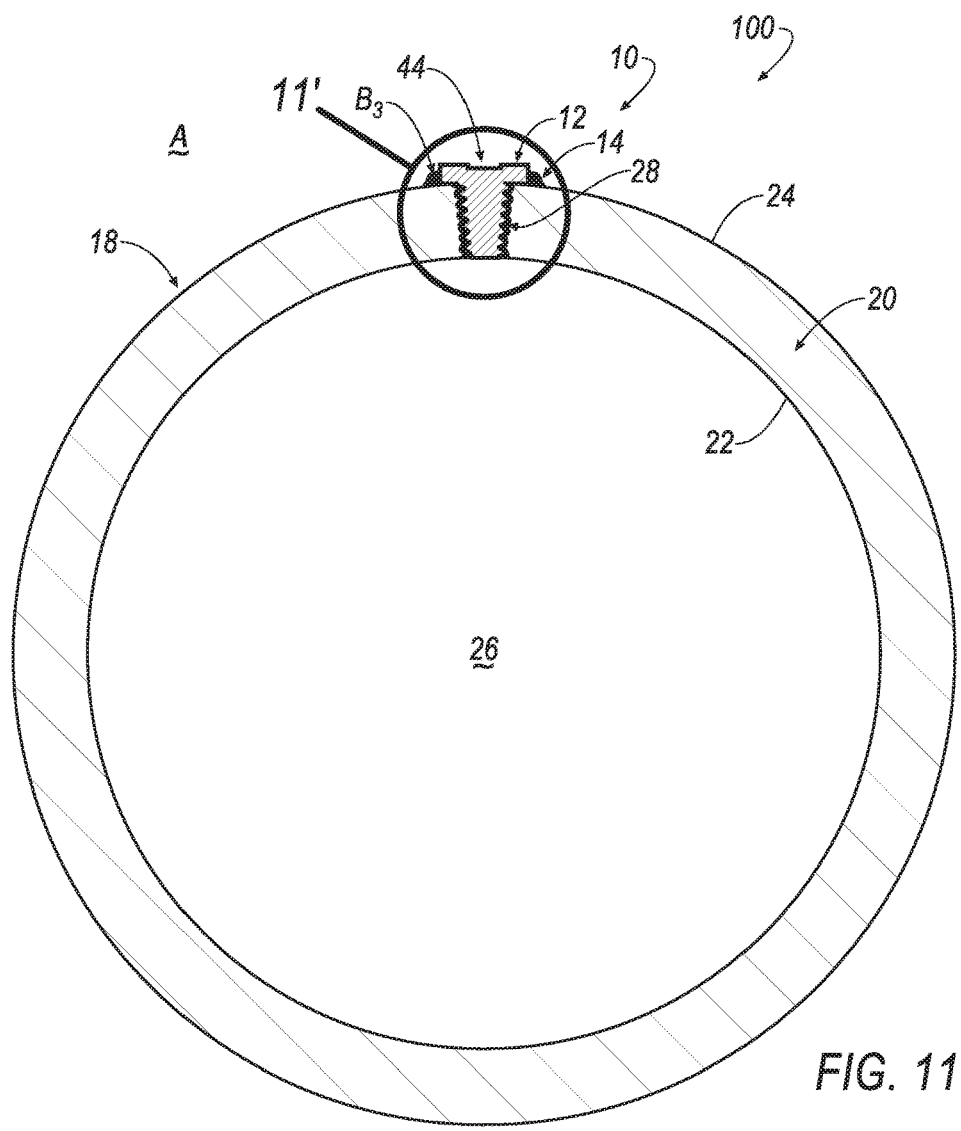
FIG. 11 is a view of an example assembly including the pinhole patch of FIG. 5.
Figure 11:
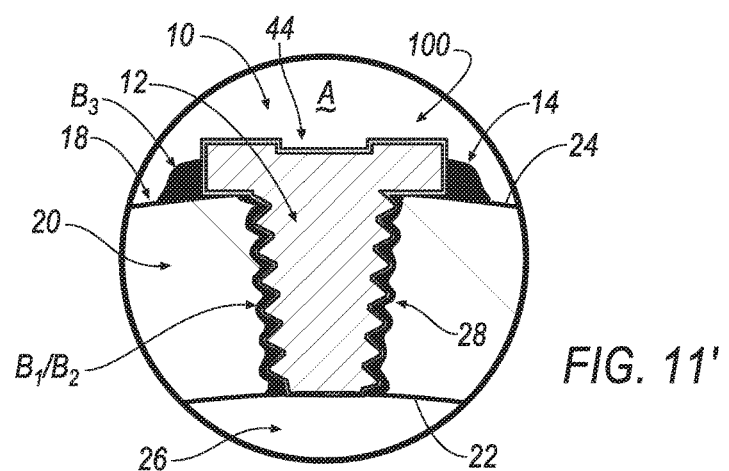

The length $L_{32}$ of the threaded portion 32 of the pinhole patch 10 may be sized in a desirable configuration. In some instances as seen at FIGS. 4 and 8A-8E, the length $L_{32}$ of the threaded portion 32 of the pinhole patch 10 is greater than the thickness $T_{20}$ of the body 20 of the pipe 18; accordingly, as seen at FIGS. 8C-8E, a portion $L_{32\text{-}P}$ of the length $L_{32}$ of the threaded portion 32 of the pinhole patch 10 may extend through the first pinhole opening $28_{O\text{-}22}$ formed by the inner surface 22 of the body 20 of the pipe 18 and into the fluid-flow cavity 26, thereby interfering with the fluid flowing through the fluid-flow cavity 26. In other examples as seen at FIGS. 5 and 10-11, the length $L_{32}$ of the threaded portion 32 of the pinhole patch 10 is approximately equal to the thickness $T_{20}$ of the body 20 of the pipe 18; accordingly, the lower surface 42 of the threaded portion 32 of the pinhole patch 10 may be arranged within the first pinhole opening $28_{O\text{-}22}$ formed by the inner surface 22 of the body 20 of the pipe 18 and be substantially aligned with the inner surface 22 of the body 20 such that the length $L_{32}$ of the threaded portion 32 of the pinhole patch 10 does not interfere with the fluid flowing through the fluid-flow cavity 26.

Figure 12:
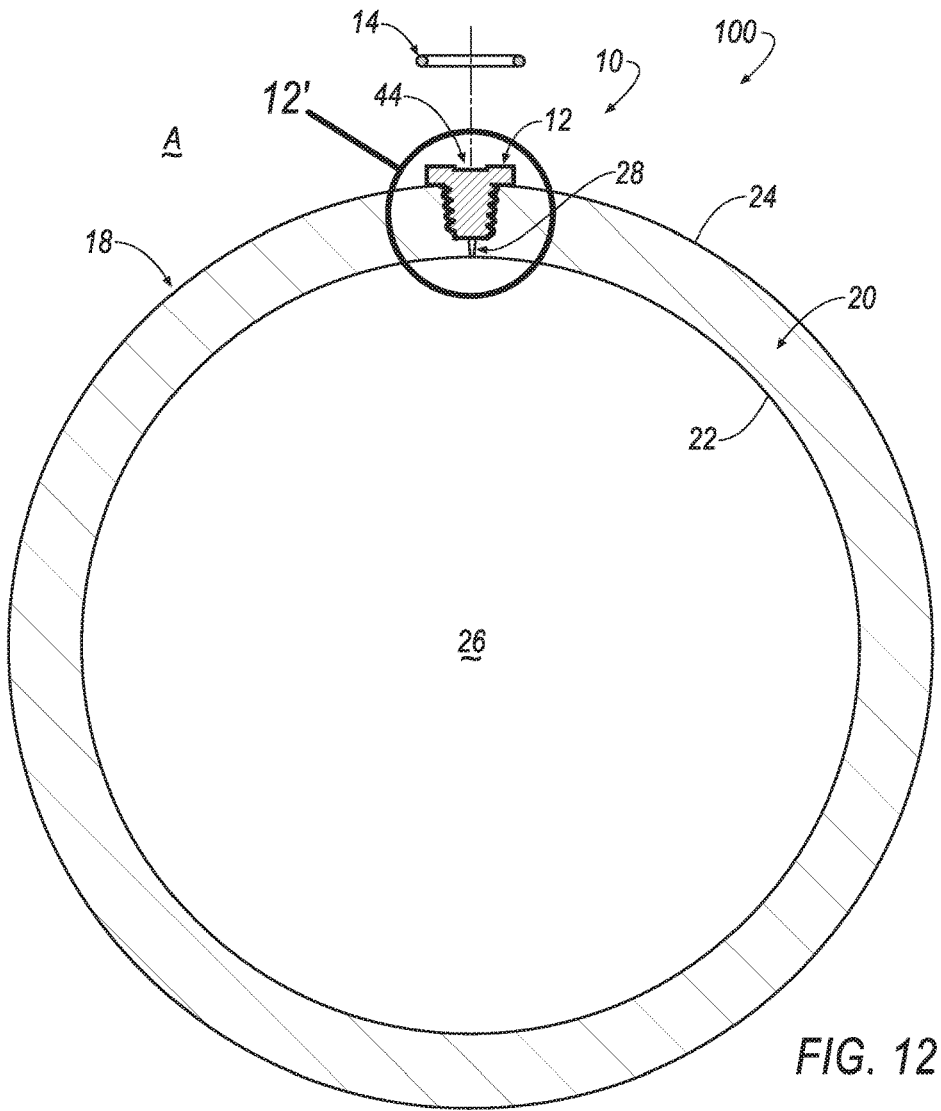
FIG. 12 is a view of an example assembly including the pinhole patch of FIG. 6.
Figure 12:
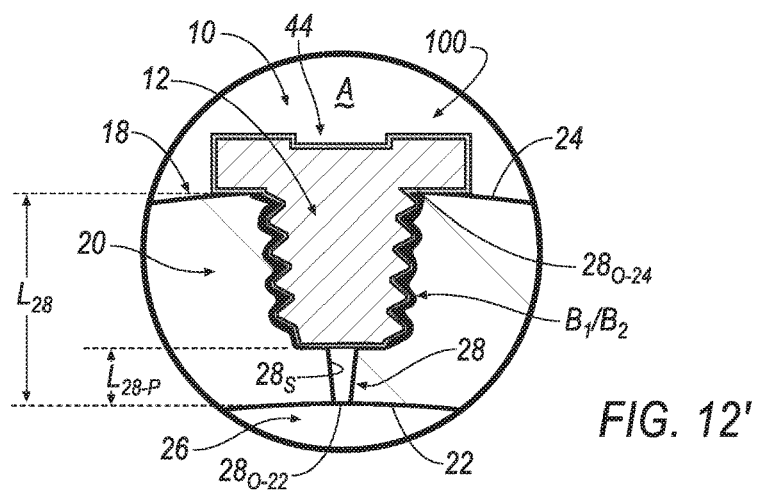
Figure 13:
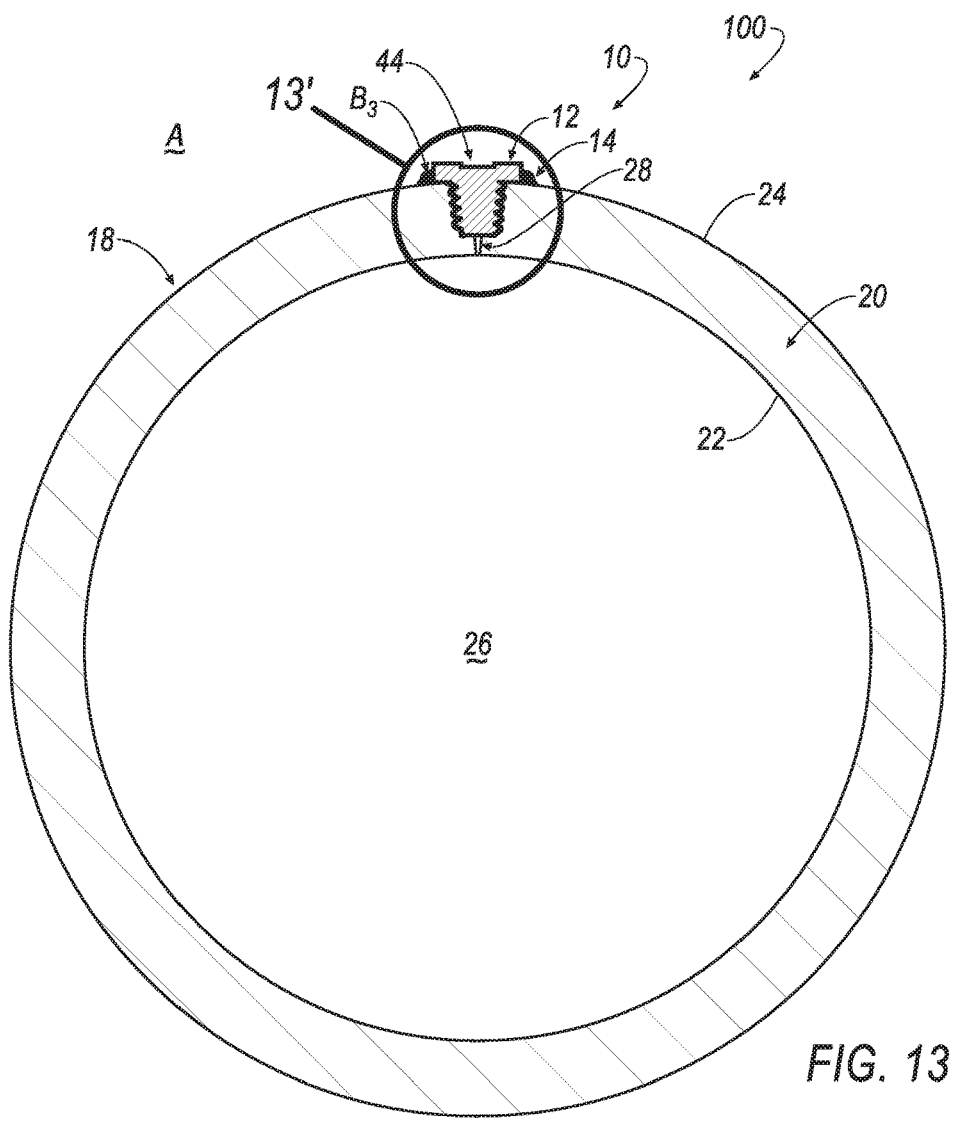
FIG. 13 is a view of an example assembly including the pinhole patch of FIG. 6.
Figure 13:
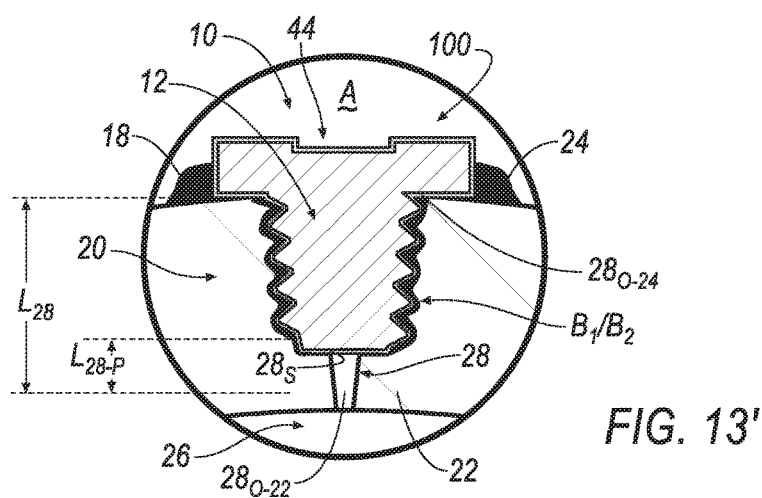

In yet other examples as seen at FIGS. 6 and 12-13, the length $L_{32}$ of the threaded portion 32 of the pinhole patch 10 is less than the thickness $T_{20}$ of the body 20 of the pipe 18; accordingly, the lower surface 42 of the threaded portion 32 of the pinhole patch 10 does not extend through the first pinhole opening $28_{O\text{-}22}$ formed by the inner surface 22 of the body 20 of the pipe 18 and may be recessed from and is not aligned with the inner surface 22 of the body 20. In such implementations, because the length $L_{32}$ of the threaded portion 32 of the pinhole patch 10 is recessed from and is not aligned with the inner surface 22 of the body 20, some of the fluid flowing within the fluid-flow cavity 26 may enter through the first pinhole opening $28_{O\text{-}22}$ formed by the inner surface 22 of the body 20 of the pipe 18 and into a portion $L_{28\text{-}P}$ (see, e.g., FIGS. 12', 13') of a length $L_{28}$ (see, e.g., FIGS. 8A, 11' and 12') of the pinhole 28 extending from the inner surface 22 of the body 20 but not through the second pinhole opening $28_{O\text{-}24}$ formed by the outer surface 24 of the body 20 of the pipe 18 and to surrounding atmosphere A.

Referring to FIGS. 4-6, one or more surfaces of the body 12 of the pinhole patch 10 includes a coating 50. Although the body 12 of the pinhole patch 10 may seal the pinhole 28 by physically filling the pinhole 28, the coating 50 may provide one or more additional functions by, for example: (1) bonding the pinhole patch 10 to the body 20 of the pipe 18 at pinhole surface $28_S$ of the pinhole 28; and (2) sealing one or more surfaces of the body 20 of the pipe 18 defined by, for example, the pinhole surface $28_S$ and at least a portion of the outer surface 24 of the body 20 of the pipe 18 that defines the second pinhole opening $28_{O\text{-}24}$ such that fluid flowing through the fluid-flow passage 26 is not permitted to escape to surrounding atmosphere A.

In some instances, the coating 50 may include, for example, solder. The solder 50 is utilized in the process of metal joining. Accordingly, in some instances, each of the body 12 of the pinhole patch 10 and the body 20 of the pipe 18 includes the same or different metal materials. The metal joining process may be a high-temperature process (e.g., welding, brazing, soldering) such that the solder 50 bonds the outer surface of the patch 10 to an inner surface of the pinhole. The pinhole patch may also include a flux, either as a separate coating in addition to the solder, a coating over the solder, or mixed along with the solder. Flux may also be provided on the piping or pinhole separately as needed. If used, the flux is nearly inert at room temperature but will become strongly reducing at elevated temperatures, preventing oxidation of a base material and a filler material defining the flux 50. The role of flux 50 is typically dual: (1) dissolving oxides already present on a surface of a metal material (e.g., a surface of each of the body 12 of the pinhole patch 10 and the body 20 of the pipe 18), which facilitates wetting by molten metal of the solder; and (2) acting as an oxygen barrier by coating the hot surface, preventing its oxidation.

In some examples, the solder coating 50 includes tin-lead solder that attaches very well to copper, but poorly to the various oxides of copper, which form quickly at soldering temperatures. In other approaches, the solder may include tin, copper, silver, bismuth, zinc, and other metals or combinations of such metals. Examples include tin-silver-copper solder, other tin-based solders or the like solders. By preventing the formation of metal oxides, the flux, if used, enables the solder to adhere to a clean metal surface, rather than forming beads, as it would on an oxidized surface. In other applications, molten solder 50 and/or flux also serves as a heat-transfer medium, facilitating heating of a joint by a soldering tool or molten solder.

Referring to FIG. 7, the coating or solder 50 may be defined by a first surface 52 that is disposed adjacent the body 12 and a second surface 54 that is exposed to surrounding atmosphere A prior to the pinhole patch 10 being disposed within the pinhole 28. Furthermore, the coating 50 may be defined by a thickness $T_{50}$ extending between the first surface 52 and the second surface 54. The thickness $T_{50}$ of the coating 50 may range between approximately about 0.01 to about 0.1 inches.

The first surface 52 of the coating 50 may coat a portion of an outer surface of the body 12 of the pinhole patch 10. In some instances, the first surface 52 of the coating 50 may be disposed over and coat at least, for example, a portion of the side surface 40 the threaded portion 32 of the pinhole patch 10. In an example, the portion of the side surface 40 the threaded portion 32 of the pinhole patch 10 that is coated with the coating 50 may correspond to a portion of the length $L_{32}$ of the threaded portion 32 of the pinhole patch 10 that contacts the pinhole surface $28_S$ of the pinhole 28; accordingly, the coating 50 may be selectively-applied to the body 12 of the pinhole patch 10 in a limited fashion such that all of the pinhole surface $28_S$ of the pinhole 28 is contacted with the second surface 54 of the coating 50 with the body 12 of the pinhole patch 10 being disposed within the pinhole 28 and joined to the body 20 of the pipe 18.

In other examples, the first surface 52 of the coating 50 may coat a portion of an outer surface of the body 12 of the pinhole patch 10. In some instances, the first surface 52 of the coating 50 may be disposed over and coat at least, for example: (1) a portion of the side surface 40 the threaded portion 32 of the pinhole patch 10; and (2) at least a portion of the lower surface 38 of the head portion 30 of the pinhole patch 10 that extends from the portion of the side surface 40 the threaded portion 32 of the pinhole patch 10. In an example, the portion of the side surface 40 the threaded portion 32 of the pinhole patch 10 that is coated with the coating 50 may correspond to a portion of the length $L_{32}$ of the threaded portion 32 of the pinhole patch 10 that contacts the pinhole surface $28_S$ of the pinhole 28; accordingly, the coating 50 may be selectively-applied to the body of the pinhole patch 10 in a limited fashion such that all of the pinhole surface $28_S$ of the pinhole 28 is contacted with the second surface 54 of the coating 50 with the body 12 of the pinhole patch 10 being disposed within the pinhole 28 and joined to the body 20 of the pipe 18. Furthermore, the at least a portion of the lower surface 38 of the head portion 30 of the pinhole patch 10 that extends from the portion of the side surface 40 the threaded portion 32 of the pinhole patch 10 that is coated with the coating 50 results in a portion of the second surface 54 of the coating 50 being disposed adjacent the outer surface 24 of the body 20 of the pipe 18 that defines the second pinhole opening $28_{O-24}$ formed by the outer surface 24 of the body 20 of the pipe 18. Therefore, in some instances, the first surface 52 of the coating 50 that coats a portion of an outer surface of the body 12 of the pinhole patch 10 may be limited to outer surface regions of the body 12 of the pinhole patch 10 that contacts the body 20 of the pipe 18 when the body 12 of the pinhole patch 10 is fully joined to the pipe 18.

In yet other examples, the first surface 52 of the coating 50 may be disposed over and coat all of the side surface 40 the threaded portion 32 of the pinhole patch 10. In further examples, all of the first surface 52 of the coating 50 may be disposed over and coat all of: (1) the side surface 40 the threaded portion 32 of the pinhole patch 10; and (2) all of the lower surface 38 of the head portion 30 of the pinhole patch 10. In further examples, the first surface 52 of the coating 50 may be disposed over and coat all of the outer surface of the body 12 of the pinhole patch 10; the outer surface of the body 12 of the pinhole patch 10 may be defined by, for example: (1) the upper surface 34, the side surface 36 and the lower surface 38 of the head portion 30; and (2) the side surface 40 and the lower surface 42 of the neck portion 32.

Figure 8B:
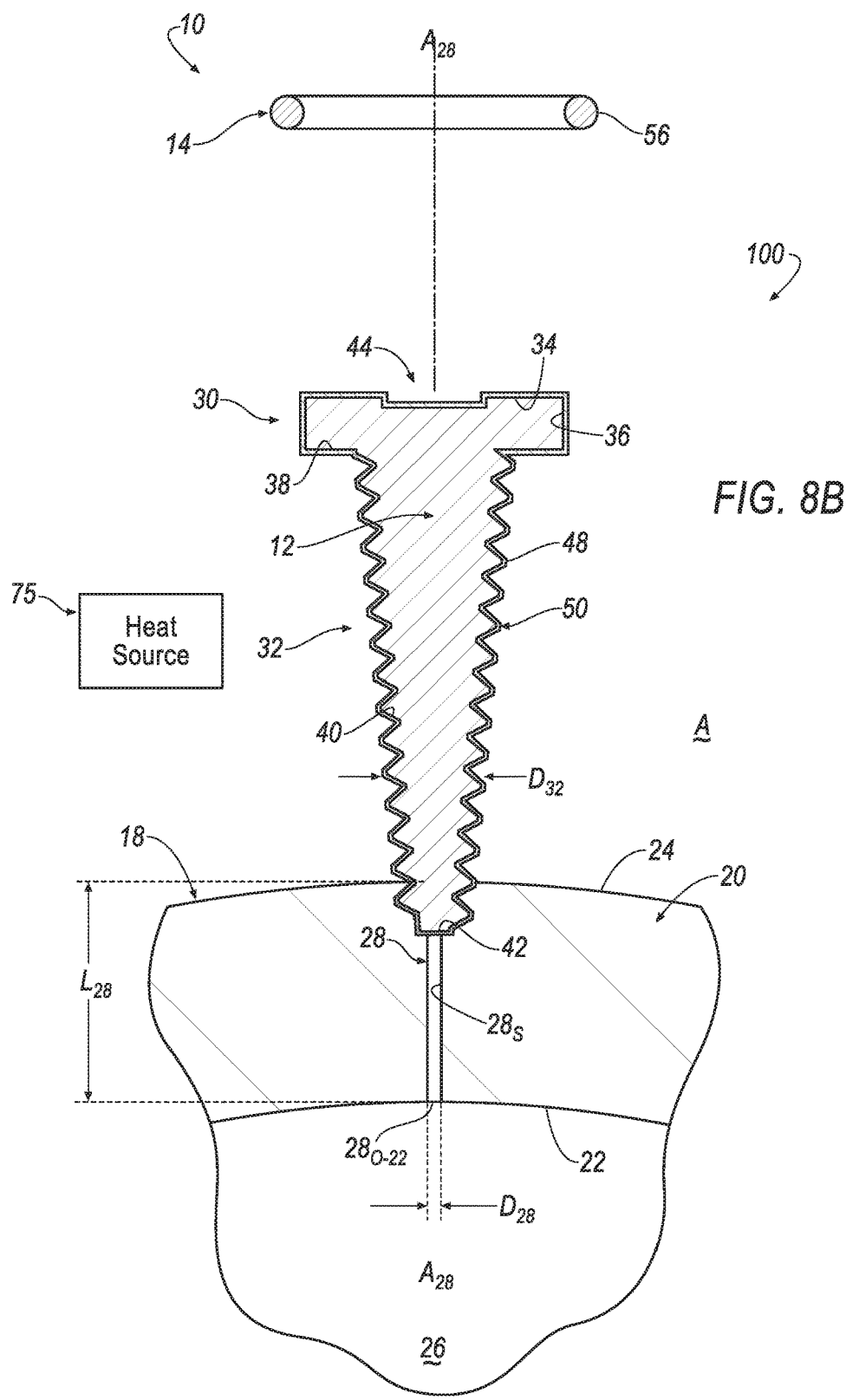
Figure 8C:
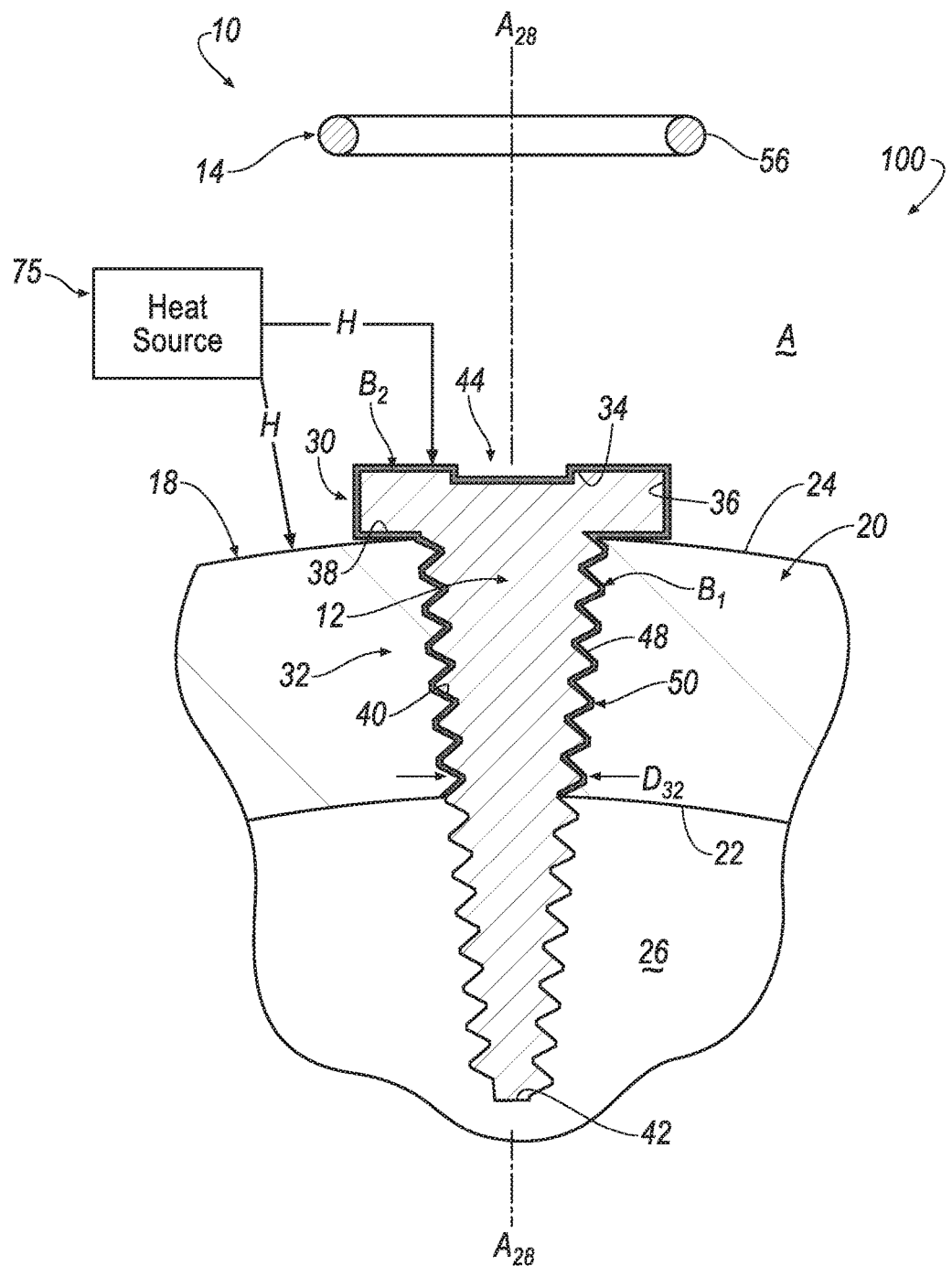
Figure 8D:
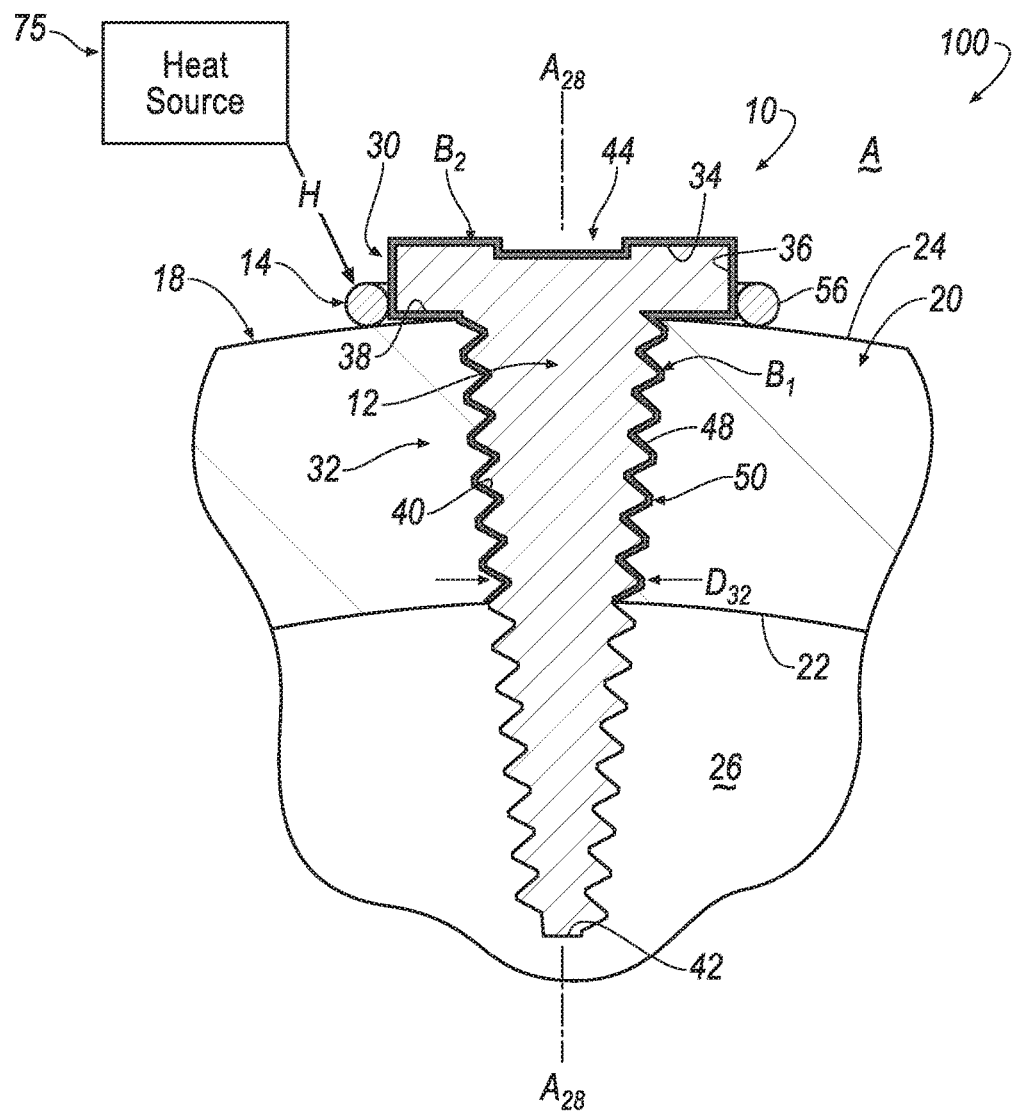
Figure 8D:
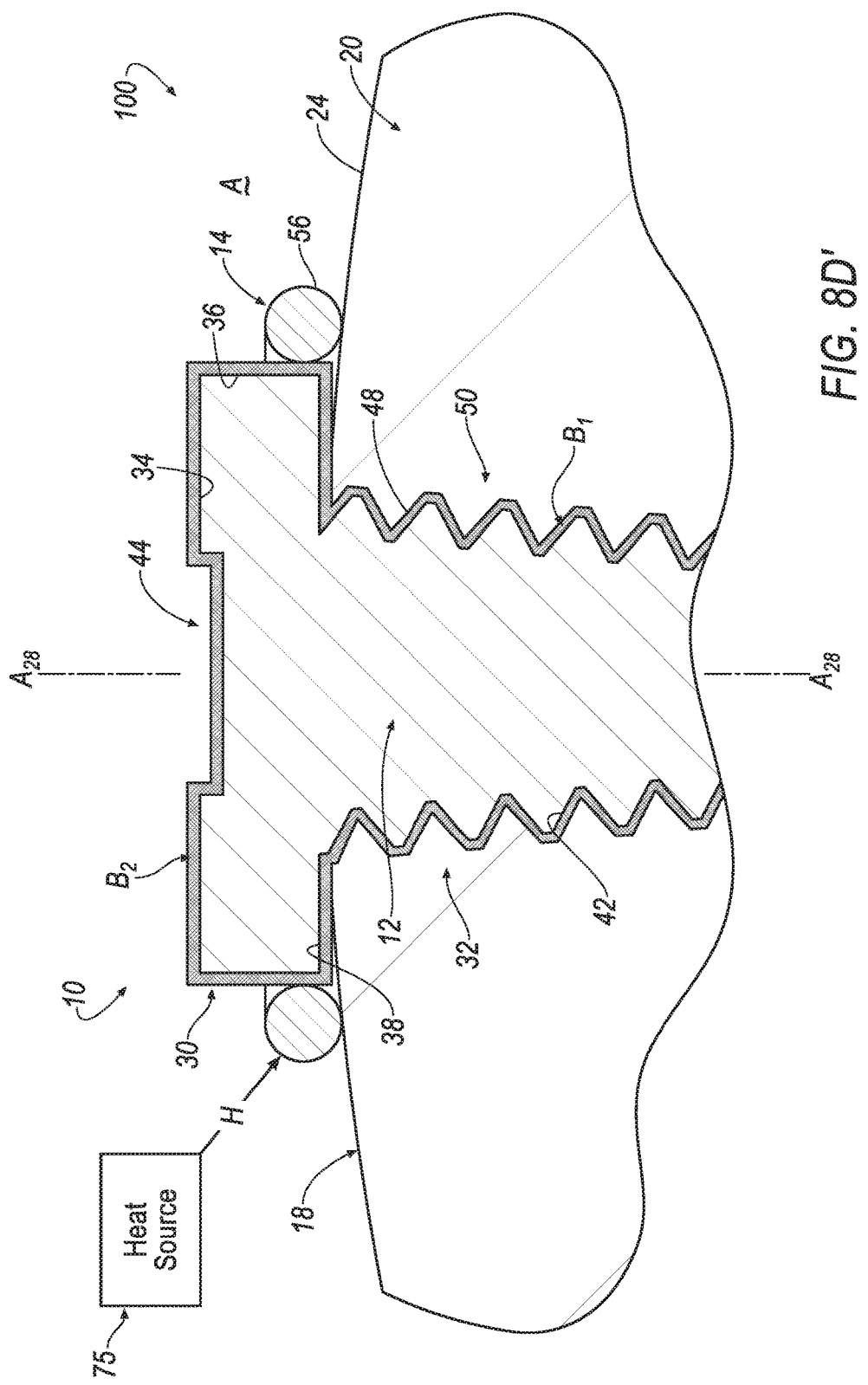
Figure 8E:
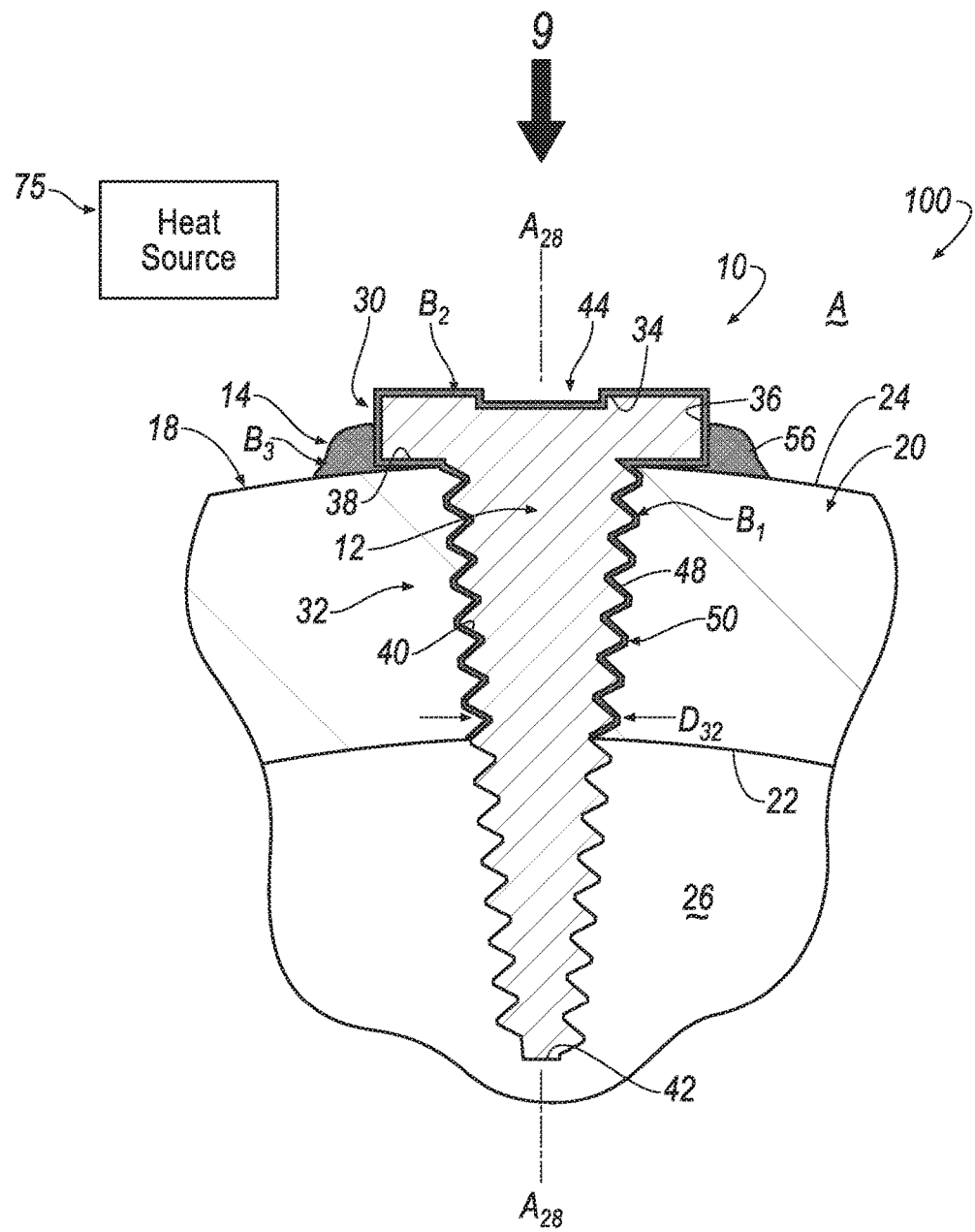
Figure 8E:
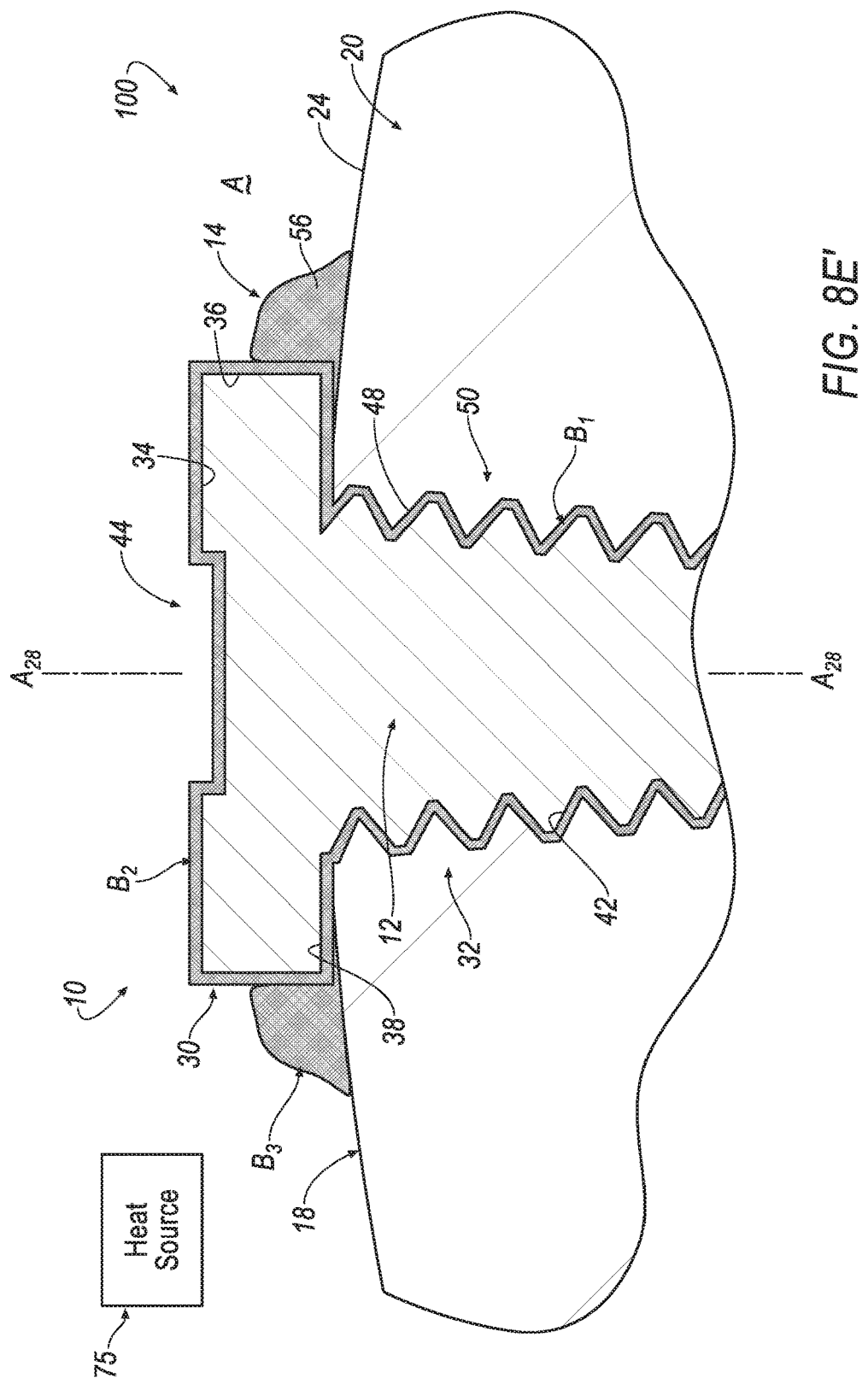
Figure 9:
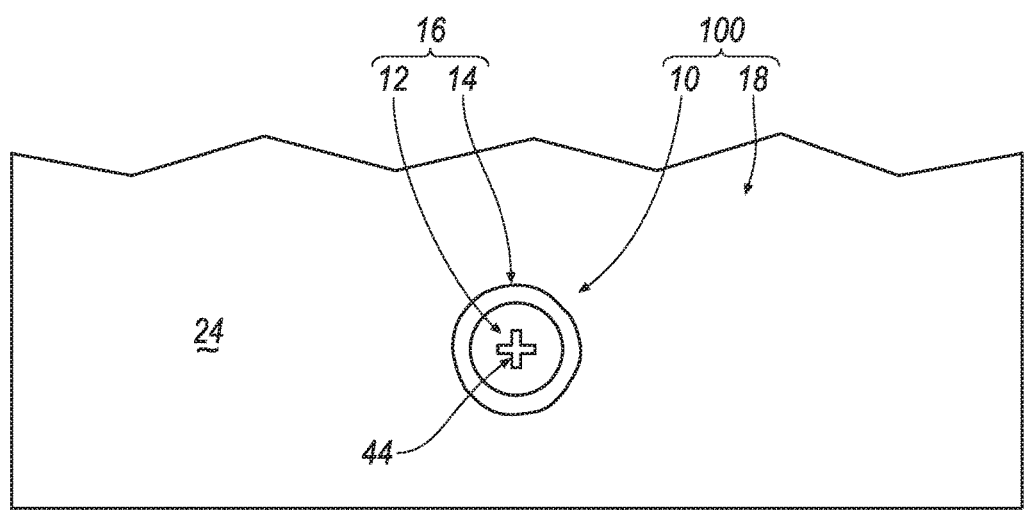
FIG. 9 is a plan view of the assembly according to line 9 of FIG. 8E, 11 or 13.

Referring to FIGS. 1A-1B and 8A-8E implementations of assembling exemplary assemblies 10 or 100 are now described. Firstly, as seen at FIG. 8A, the threaded portion 32 of the pinhole patch 10 is axially-aligned with an axis $A_{28}$-$A_{28}$ that extends through an axial center of the pinhole 28. Then, as seen at FIGS. 8A-8B, the threaded portion 32 of the pinhole patch 10 is passed: (1) through the second pinhole opening $28_{O-24}$ formed by the outer surface 24 of the body 20 of the base structure 18; (2) through the pinhole 28; and (3) out of the first pinhole opening $28_{O-22}$ formed by the inner surface 22 of the body 20 of the pipe 18. As seen at FIG. 8A, the diameter $D_{28}$ defined by the pinhole 28 is less than the diameter $D_{32}$ of the threaded portion 32; accordingly, as the threaded portion 32 of the pinhole patch 10 is passed through the pinhole 28, the material interference of the thickness $T_{20}$ of the body 20 results in the threaded portion 32 of the pinhole patch 10 tapping the pinhole surface $28_S$ of the pinhole 28 such that helical thread 48 extending from the side surface 40 of the threaded portion 32 results in mechanical coupling that resulting in the body 12 of the pinhole patch 10 being mechanically joined to the body 20 of the pipe 18.

During the rotation of the threaded portion 32 of the body 12 of the pinhole patch 10 relative the body 20 of the pipe 18 for joining the body 12 of the pinhole patch 10 to the body 20 to the pipe 12, the friction arising from the forced contact of the outer surface of the body 12 of the pinhole patch 10 with the pinhole surface $28_S$ of the pinhole 28 results in heat being generated that activates the flux and/or the solder coating 50. Accordingly, the coating 50 may chemically bond $B_1$ (see, e.g., FIG. 8B') and subsequently fluidly-seal the outer surface of the body 12 of the pinhole patch 10 with the inner pinhole surface $28_S$ of the pinhole 28 as a result of frictionally-applied heat.

Referring to FIG. 8C, in some instances, an external heat source 75 may optionally elevate the temperature of one or both of the body 12 of the pinhole patch 10 and the body 20 of the pipe 18 in order to apply heat H to one or more of the body 12 of the pinhole patch 10 and the body 20 of the pipe 18 in order to optionally activate the solder coating 50 for the chemically bonding $B_2$ (see, e.g., FIGS. 8C'-8E') and subsequently fluidly-sealing the outer surface of the body 12 of the pinhole patch 10 with the pinhole surface $28_S$ of the pinhole 28 as a result of externally-applied heat. The heat source 75 directly conducts the heat H or radiates the heat H.

Once the body 12 of the pinhole patch 10 is joined to the body 20 of the pipe 18, an exemplary assembly 100 may include the pinhole patch 10 and the pipe 18. However, other assemblies 100 may further include the optional fluid seal 14, which may be defined by an optional length of solder 56 (see also FIGS. 1A-1B, 2A-2B and 3A-3B) that is optionally applied (wrapped) to one or both of the body 12 of the pinhole patch 10 and the body 20 of the pipe 18 for further chemically bonding $B_3$ (see, e.g., FIG. 8E') and subsequently fluidly-sealing the outer surface of the body 12 of the pinhole patch 10 with the body 20 of the pipe 18. In an example as seen at FIG. 8D, the length of solder 56 optionally surrounds the side surface 36 of the head portion 30 and is optionally disposed adjacent a portion of the outer surface 24 of the body 20 of the pipe 18 that is near the side surface 36 of the head portion 30. Then, as seen at FIGS. 8D-8E, the heat source 75 may optionally elevate the temperature of one or more of: (1) the length of solder 56; (2) the body 12 of the pinhole patch 10; and (3) the body 20 of the pipe 18 in order to optionally apply heat H to one or more of the length of solder 56, the body 12 of the pinhole patch 10 and the body 20 of the pipe 18 in order to activate the length of solder 56. The heat source 75 directly conducts the heat H or radiates the heat H. Accordingly, the optional length of solder 56 may further optionally chemically bond (see, e.g. $B_2$ and $B_3$ at FIG. 8E') and subsequently fluidly-seal the outer surface of the body 12 of the pinhole patch 10 with the body 20 of the pipe 18.

Although exemplary methodologies for joining the body 12 of the pinhole patch 10 with the body 20 of the pipe 18 is described above for providing an optional assembly 100 in view of the body 12 of the pinhole patch 10 described above at FIG. 4, other assembling methodologies and other assemblies 100 are equally applicable when utilizing the body 12 of the pinhole patch 10 described above at FIGS. 5 and 6, respectively. Accordingly, exemplary assemblies 100 including the body 12 of the pinhole patch 10 of FIG. 5 is shown at FIGS. 10, 10', 11 and 11'. The assembly 100 of FIGS. 10, 10', 11 and 11' may also optionally include the fluid seal 14. Furthermore, assemblies 100 including the body 12 of the pinhole patch 10 of FIG. 6 is shown at FIGS. 12, 12', 13 and 13'. The assembly 100 of FIGS. 12, 12', 13 and 13' may also optionally include the fluid seal 14. In some approaches, there may be a small gap 25 between the bottom surface of the patch head portion 30 and an outer surface of the pipe wall (see, e.g., FIG. 8D"). This gap 25 may receive molten solder form the externally wrapped solder 56 as shown in FIGS. 8E and 8E". This solder in the gap 25 may further seal the pinhole and it may be a combination of solder 50 from the screw as well as solder 56 that is externally wrapped around the head 30.

A number of implementations have been described. Nevertheless, it will be understood that various modifications may be made without departing from the spirit and scope of the disclosure. Accordingly, other implementations are within the scope of the following claims.

What is claimed is:

1. An assembly comprising:
   a base structure including a body that defines a pinhole;
   a pinhole patch that extends at least partially into and at least partially fills the pinhole, wherein an outer surface of the pinhole patch defines self-tapping helical threads that are disposed adjacent and mechanically joined to a pinhole surface that defines the pinhole; and
   a tin-based solder coating disposed over at least a portion of the outer surface of the pinhole patch having the self-tapping helical threads and that bonds at least a portion of the self-tapping helical threads of the pinhole patch at least to the pinhole surface that defines the pinhole;
   wherein the base structure is a pipe, wherein the body is tube-shaped and includes an inner surface and an outer surface, wherein the body is defined by a thickness extending between the inner surface and the outer surface, wherein the inner surface defines a fluid-flow passage, and wherein the pinhole extends though the thickness; and
   wherein the pinhole patch extends through the pinhole, and wherein the pinhole patch includes a lower surface that is aligned with the inner surface of the tube-shaped body of the pipe, and wherein the pinhole patch does not extend beyond the inner surface of the tube-shaped body of the pipe.

2. The assembly of claim 1, wherein the tube-shaped body of the pipe includes an upstream end, a downstream end and a curved portion that is downstream of the upstream end and upstream of the downstream end.

3. The assembly of claim 2, wherein the pinhole is formed upstream of the curved portion.

4. The assembly of claim 2, wherein the pinhole is formed downstream of the curved portion.

5. The assembly of claim 2, wherein the pinhole is formed by the curved portion.

6. The assembly of claim 1 further comprising:
   an implement-receiving recess formed in a head portion of the pinhole patch that is sized for receiving a fastening implement.

7. The assembly of claim 1 further comprising:
   a separate length of tin-based solder at least partially surrounding the head portion of the pinhole patch that bonds the head portion of the pinhole patch to the outer surface of the tube-shaped body of the pipe.

8. A subassembly that is sized for arrangement within a pinhole defined by a pinhole surface formed by a tube-shaped body defining a pipe having a fluid-flow passage, the subassembly comprising:
   a pinhole patch including:
   a head portion; and
   a neck portion extending from the head portion, wherein the neck portion is configured to extend at least partially into and is configured to at least partially fill the pinhole, wherein an outer surface of the neck portion of the pinhole patch defines self-tapping helical threads configured for being mechanically joined to the pinhole surface;
   a tin-based solder coating disposed over at least a portion of the outer surface of the pinhole patch having the self-tapping helical threads, wherein the tin-based solder coating is configured to bond the outer surface of the self-tapping helical threads of the pinhole patch to the pinhole surface; and
   wherein the pipe includes an inner surface and an outer surface, wherein the pipe body is defined by a thickness extending between the inner surface and the outer surface, and wherein the pinhole extends though the thickness; and
   wherein the pinhole patch extends through the pinhole and does not extend beyond the inner surface of the tube-shaped body of the pipe.

9. The subassembly of claim 8, wherein the tin-based solder coating is further disposed over a lower surface of the head portion of the pinhole patch, wherein the tin-based solder coating is configured to bond the lower surface of the head portion of the pinhole patch to an outer surface of the tube-shaped body defining the pipe.

10. The subassembly of claim 8 further comprising:
    an implement-receiving recess formed in a head portion of the pinhole patch that is sized for receiving a fastening implement.

11. The subassembly of claim 8 further comprising: a length of separate tin-based solder at least partially surrounding the head portion of the pinhole patch that bonds the head portion of the pinhole patch to the outer surface of the tube-shaped body of the pipe.

* * * * *